United States Patent [19]

Quint et al.

[11] Patent Number: 5,021,995

[45] Date of Patent: Jun. 4, 1991

[54] DATA EXCHANGE APPARATUS AND METHODS

[75] Inventors: Jeanne M. Quint, Manchester; John M. Pratt, Atkinson, both of N.H.

[73] Assignee: Wang Laboratories, Inc., Lowell, Mass.

[21] Appl. No.: 809,985

[22] Filed: Dec. 17, 1985

[51] Int. Cl.$^5$ .............................................. G06F 3/14
[52] U.S. Cl. .................................... 364/900; 364/518; 364/521
[58] Field of Search ... 364/200 MS File, 900 MS File, 364/300, 518, 521; 382/1, 6, 7, 56, 61

[56] References Cited

U.S. PATENT DOCUMENTS

| | | | |
|---|---|---|---|
| 3,872,462 | 3/1975 | Lemelson | 360/32 |
| 4,156,909 | 5/1979 | Barton et al. | 364/200 |
| 4,286,330 | 8/1981 | Isaacson | 364/900 |
| 4,389,706 | 6/1983 | Gomola | 364/130 |
| 4,417,322 | 11/1983 | Berry et al. | 364/900 |
| 4,434,475 | 2/1984 | McCaskill et al. | 364/900 |
| 4,503,499 | 3/1985 | Mason et al. | 364/200 |
| 4,507,753 | 3/1985 | McCaskill et al. | 364/900 |
| 4,587,633 | 5/1986 | Wang et al. | 364/900 |
| 4,667,290 | 5/1987 | Goss et al. | 364/300 |
| 4,685,068 | 8/1987 | Greco, II et al. | 364/518 |
| 4,687,353 | 8/1987 | DeGeorge et al. | 400/76 |
| 4,713,780 | 12/1987 | Schultz et al. | 364/514 |

*Primary Examiner*—David L. Clark
*Attorney, Agent, or Firm*—Michael H. Shanahan

[57] ABSTRACT

Apparatus and methods for the exchange of data between files having different types. The apparatus includes means for reading a logical record from a source file and using the data contained therein in the production of a generic form in which data is represented as an arrangement of displayable characters and means for using the data represented in the generic form to produce a logical record for a destination file. The means for producing the generic form may further include means for inserting a user-defined code in the generic form to mark fields of the source file logical record. The means for producing the destination file logical record may then employ the user-defined code to produce corresponding fields in the destination file logical record. The apparatus may further include data viewing means which permits the user to view the generic form and interactively define fields therein. The means for producing the destination file logical record may then employ the field definition for the generic form to produce corresponding fields in the destination file logical record.

62 Claims, 16 Drawing Sheets

| C | ;Y | 3 | ;X | 1 | ;K | "ATTEN BERGER, T M     " |

| C | ;X | 2 | ;K | "66-6666666" |

| C | ;X | 3 | ;K | 18094.12 |

| C | ;X | 4 | ;K | 18520.21 |

| F | ;F | G | L | 20 | ;C | 1 |

| F | ;F | G | R | ID | ;C | 2 |

FIG. 6:

SREC 515 { SRECT 601

| ID 603 | B 605 | C 607 | ;X 609 | VAL 611 | ;Y 613 | VAL 615 | ;K 617 | VAL 619 | C | ;X | VAL | ;Y | VAL | ;E 621 | VAL 623 | ;K | VAL |

| F 625 | ;F 627 | VAL 629 | ... | C | ;X | VAL | ;Y | VAL | ;S 635 | VAL | ;R 637 | VAL 639 | ;C 641 |

| VAL 643 | E 645 |

SYLK F 513

FIG. 8:

| ATTEN BERGER TM | 66-6666666 | 18094.12 | 18520.21 |

801 GF 121 WITHOUT INSERTED CHAR

| IC | ATTEN BERGER TM | IC | 66-66666 | IC | 18044.12 | IC |
805

| 18520.21 |

803 GF 121 WITH INSERTED CHARACTER

```
FROM ROW   1         ╱1301
THRU ROW   999999 ╱1303
           COLUMN  1                    COLUMN DATA      ╱1305    COLUMN 64
                   +++++++++++++++++++++++++++++++++++++/+++++++++++++++++++

ROW   1      ╱SMITH    JOHN    034682571  032258 ⎫
             / JONES    ROBERT  138483992  100244 ⎬ 1307
       1309(a)  JOHNSON  ANN              423559434  042451 ⎪
                SANTO    ANTHONY 838059393  040384 ⎭
```

PLEASE ENTER INFORMATION ╱1311

| (1)             | (5) NEXT    | (9) LEFT MARGIN  | (13) |
|-----------------|-------------|------------------|------|
| (2)             | (6) DOWN    | (10) RIGHT MARGIN| (14) |
| (3) HEX DISPLAY | (7) UP      | (11) LEFT 64     | (15) |
| (4)             | (8)         | (12) RIGHT 64    | (16) |

FIG. 13:

DATA EXCHANGE APPARATUS AND METHODS

BACKGROUND OF THE INVENTION

1. Field of the Invention

The present invention relates to apparatus and methods used in data processing systems to exchange data among files when the files are organized differently and employ different techniques to represent the data.

2. Description of the Prior Art

Files are used in data processing systems for the permanent storage of data. Many different ways of organizing files exist in the prior art. For example, a file may be organized as a set of records, and data accessed by specifying the record. Further, a file may be organized as a sequence of bytes, any one of which may be specified, as a sequence of lines, any one of which may be specified, or as a stream, i.e., having a beginning and end, but no particular internal structure. Moreover, the physical organization of a file may be different from its logical organization. For example, in some spread sheet files, the row and column organization of the file is specified not by the order of the records in the spread sheet file, but rather by coordinates contained in the record.

In addition to differing in the manner in which they are organized, files also differ in the manner in which they represent the data they contain. In some files, both numeric and non-numeric values appear as sequences of character codes., in others, numeric values may have special representations. In some cases, the kind of representation depends on the type of numeric value so that fixed decimal values are represented differently from integer values or floating point values. All files which employ a given form of organization and given representations of the data are regarded as having the same file type.

The fact that files ma have different types has made the exchange of data between files difficult. For example, a user of a data processing system may have value which he wishes to incorporate in a document in a spreadsheet; however, because the document file and the spreadsheet file have different types, the user cannot simply incorporate the portion of the spreadsheet containing the desired values into his document. As data processing systems become more widespread, as the number of file types and applications increase, and as the degree of interconnection grows, the need grows for apparatus and techniques which make data exchange between files having different types easier.

In the prior art, the data exchange problem has been generally solved in two ways: first, special data exchange programs have been built to exchange data between files of two specific types. Second, intermediate file types have been developed, and exchange between files of two specific types is done by employing a first data exchange program to exchange data between the file of the first type and a file of the intermediate type and a second data exchange program to exchange data between the file of the intermediate type and the file of the second type.

Neither of the prior art approaches to data exchange is completely satisfactory. With special data exchange programs, there are two problems: first, there must be a separate program for each pair of file types, and the number of special data exchange programs necessary proliferates rapidly as the number of file types increases. Second, the writer of such a program must understand the details of both of the file types between which data is to be exchanged. With data exchange by means of intermediate files, the problems are the following: first, no single intermediate file type has evolved. Instead, intermediate file types have proliferated in the same fashion as other file types and much of the advantage of the intermediate file approach has been lost. Second, as might be expected from the proliferation of intermediate file types, a given intermediate file type is generally advantageous for some data exchanges and not for others. Thus, intermediate file types which are good for exchanges involving files containing documents are not good for exchanges involving spread sheet files and vice-versa. There is thus a need in the art for improved apparatus and methods for exchanging data between files having different types. The invention described hereinbelow provides such apparatus and methods.

SUMMARY OF THE INVENTION

The present invention solves the problems of prior-art data exchange apparatus and methods by providing apparatus which reads a logical record from a source file having a first type, produces a generic form which represents the contents of the logical record, and produces a logical record for a destination file having a second type from the generic form. The data values contained in the logical file are represented solely by means of codes for displayable characters. Any information about the relationship of the data values to each other is reresented by means of the arrangement of the displayable character codes representing the data. Because the generic form's representation is nothing more than an arrangement of displayable characters, the representation is completely independent of any file type. The complete independence of the generic form eliminates any need for the part of the apparatus which produces the generic record from a logical record to take any account of the type of the destination file or for the part of the apparatus which produces the logical record for the destination file to take any account of the type of the source file. In some cases, the production of the generic form from the source file logical record or the production of the destination file logical record from the generic form may take several steps. For example, if the destination file is located on a remote system, a communications protocol may first be produced from the generic form and the destination file record may then be produced from the communications protocol. Again, such transformations are made easier by the complete independence of the generic form from an file or protocol type.

While the generic form is itself completely independent of any file type, another aspect of the invention permits a user of the apparatus to take advantage of his knowledge of the properties of the destination file type by defining a character code which the apparatus inserts into the generic form to separate fields and to mark empty fields in the generic form. The character code so employed may be any character code, displayable or not, and is generally chosen so as to be advantageous for separating fields of information in the destination file.

Yet another advantageous aspect of the generic form is that it is possible using the generic form to construct apparatus which permits a user to view logical records in a multiplicity of file types. This apparatus reads a logical record from the file being viewed by the user, produces the generic form of the logical record, and then produces a displayable form from the generic form and outputs it to the user's display device. Again, the part of the apparatus which produces the generic form need not take into account the characteristics of the user's display device and the part which produces the displayable form need not take the characteristics of the file being viewed into account.

In another aspect of the invention, the user of either the exchange apparatus or the record viewing apparatus ma provide that only selected parts of the source file be exchanged or viewed.

Further aspects of the invention include methods for producing the generic form from file types belonging to each of four basic classes of file types and for producing records for file types belonging to the basic file types from the generic form.

The first class of file types are the stream files. A stream file is without record structure, so the method for producing a generic form from the stream file begins by dividing the stream file into portions. A generic form is then produced from each portion. A stream file is produced from the generic records by outputting each generic record in turn to the stream file.

The second class of file types are the record files. In a record file, the data is in a sequence of physical records. A generic form is produced from a record by representing the contents of the physical record as displayable characters. A physical record is produced from the generic form by representing the contents of the generic form as required by records of the given type.

The third class of file types are the record and field files, represented by the spread sheet file. The data in such a file represents a table having rows and columns. The intersection of a row and column is termed a cell. In the record and field file, each cell which contains data is represented by a physical record. With these files, the method for producing the generic record is the following: The file is read until all data belonging to a single row of the table is located; that data makes up a logical record, and the generic form is produced from the logical record, with the contents of the cells making up the row being represented by displayable characters and having the same order as in the row. The method for producing cells from the generic record is to determine the row represented by a given generic form from the order in which the generic form is received and to determine what column a given part of the generic form belongs to by its position in the generic form.

The fourth class of file types are the document files. A document file consists of a set of blocks. The blocks typically include text blocks which represent the document s text, attribute blocks which represent additional information such as format information, and index blocks by means of which the other blocks may be located. The generic form is produced from the text blocks only, and is produced by placing the displayable characters from the text block in the generic form. Text blocks are produced from the generic form by placing the displayable characters from the generic form into a text block and adding whatever additional information may be necessary.

It is thus an object of the invention to provide an improved data or document processing system;

It is another object of the invention to provide improved methods and apparatus for exchanging data between files having different types;

It is an additional object of the invention to provide apparatus for exchanging data between files having different types which employs a generic form to transfer the data between the files;

It is a further object of the invention to provide apparatus for exchanging data between files which permits the user to define a separator character which separates fields in an exchanged record;

It is yet another object of the invention to provide apparatus for viewing data in files having a plurality of types by producing a generic form from a logical record in the file being viewed and outputting the generic form to a display device;

It is a still further object of the invention to provide methods employing the generic form to exchange data between files having file types including stream file types, record file types, record and field file types, and document file types.

Other objects and advantages of the present invention will be understood by those of ordinary skill in the art after referring to the detailed description of a preferred embodiment and the drawings, wherein:

BRIEF DESCRIPTION OF THE DRAWINGS

FIG. 6 is a diagram of a typical SYLK file;

FIG. 8 is an example of a generic form corresponding to the row of FIG. 7;

FIG. 13 is a screen used in operation of VD 123;

Figure 1:
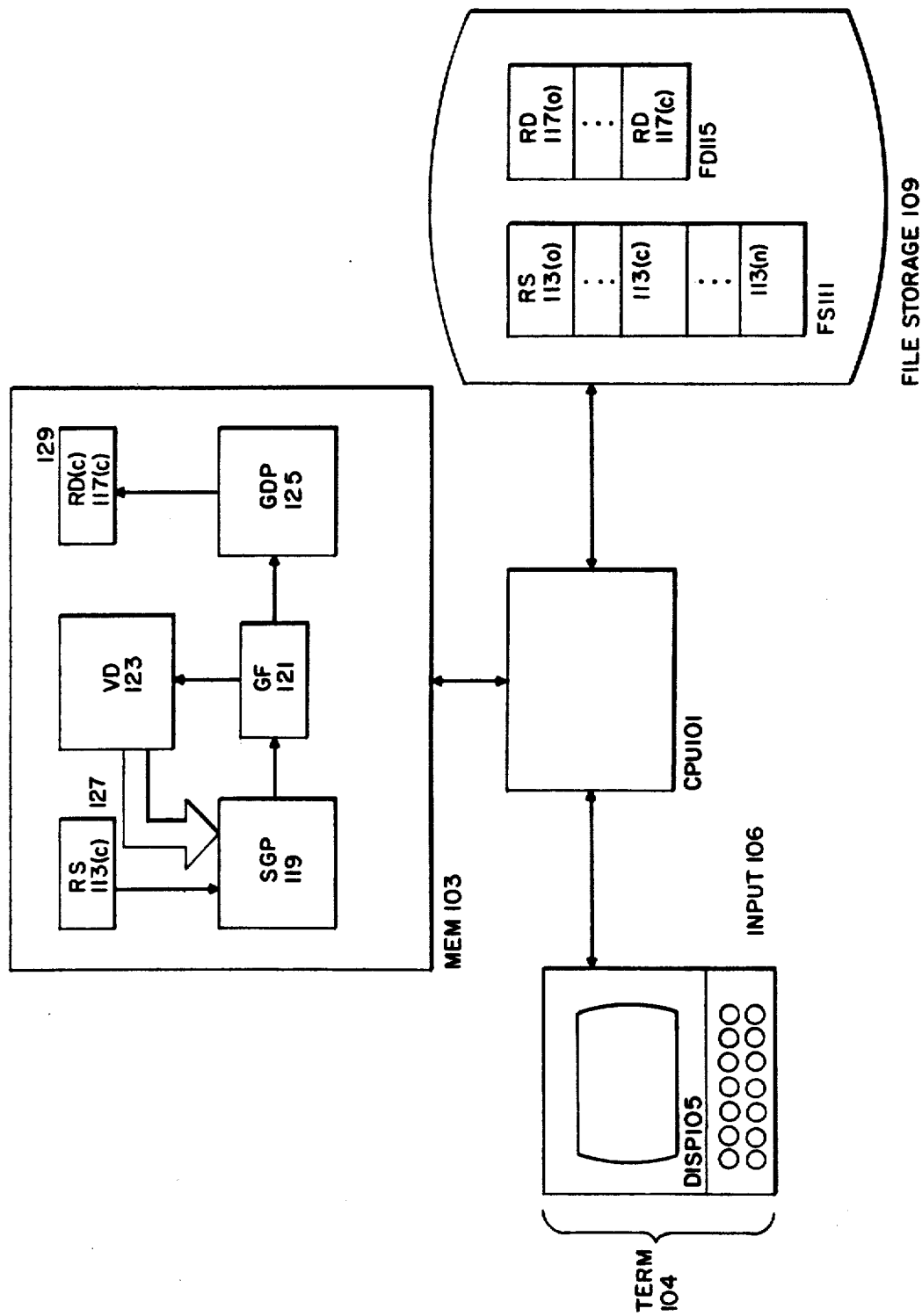
FIG. 1 is a block diagram overview of data exchange apparatus employing the generic form.

In the block diagrams, invocation of one program component by another is indicated by a broad arrow; flows of data between program components and between program components and data structures are indicated by single-line arrows. Reference numbers employed in the drawings have two parts: the rightmost digits are a drawing number and the leftmost 2 digits indicate an item in the specified drawing. Thus, the reference number 123 refers to an item which first appears in FIG. 1.

DESCRIPTION OF A PREFERRED EMBODIMENT

The following description of a preferred embodiment first provides an overview of data exchange apparatus employing the generic form and then discusses a preferred embodiment as it is employed to exchange data between a source file of the SYLK record and field type and a destination file of the WP+ document type. SYLK files are data interchange files used with Multiplan (trademark of Microsoft Corporation) spread sheets and WP+ document files are used in word processing systems manufactured by Wang Laboratories, Inc. SYLK files are fully described in Multiplan documentation and WP+ document files are fully described in U.S. patent application Ser. No. 122,594, filed Nov. 17, 1987, which is a continuation of U.S. patent application Ser. No. 656,831, filed Oct. 2, 1984 and since abandoned. Thereupon, the preferred embodiment is discussed as it is employed to view data contained in a file.

1. Overview of Data Exchange using the Generic Form: FIG. 1

FIG. 1 shows an overview of apparatus for data exchange using the generic form as it is embodied in a digital computer system. Arrows in the figure show the flow of data between the components of the apparatus. The basic components of the digital computer system are CPU 101, display (DISP) 105, which displays data output from CPU 101, Input 106, from which data may be input to CPU 101, memory (MEM) 103, which stores programs while they are being executed by CPU 101 and data while it is being operated on by CPU 101 in response to the programs, and File Storage 109, usually a magnetic disk system, upon which data is permanently stored in files. The digital computer system may be any of such systems known to the art. Display 105 and Input 106 will typically be embodied in a CRT terminal (TERM 104), with the screen serving as Display 105 and the keyboard as Input 106.

As previously explained, files may have different types, depending on how they are organized and how the data they contain is represented in the file. The contents of a file may be subdivided into records. Many file types have physical records, i.e., subdivisions which are physically marked in the file. The I/O routines which read and write data in files with physical records respond to the physical markers for the subdivisions. All file types may be regarded as having logical records, i.e. subdivisions of the file contents which are meaningful from the point of view of the user of the file. Examples of subdivisions which might be regarded as logical records are lines or pages in a document or rows in a spreadsheet. In some file types, the logical records and physical records coincide, in others, several physical records may correspond to one logical record or vice-versa. For example, in SYLK files, the physical record is the cell, while the logical record, the row, contains a number of cells.

File storage 101 is shown in FIG. 1 as containing two files of different types: source file (FS) 111 and destination file (FD) 115. FS 111 contains logical records RS 113; a given logical record is indicated by a subscript on the reference number; thus, the first RS 113 in the file is RS 113(0). FD 115 contains logical records RD 117., again, a given logical record is indicated by a subscript.

When the data processing system of FIG. 1 is being used to exchange data between FS 111 and FD 115, MEM 103 contains the following programs and data:
Source-to-generic form program (SGP 119), which reads an RS 113 from FS 111 and produces a generic form therefrom;
Generic form-to-destination program (GDP 125) which produces an RD 117 from the generic form;
Buffer 127, which receives RS 113 currently being worked on from FS 111; and
Buffer 129, which receives RD 117 intended for FD 115; and
Generic form (GF) 121, which is the generic form produced from RS 113 currently being worked on and from which RD 117 is produced.

FIG. 1 additionally shows viewdata program (VD) 123, which receives the contents of GF 121, puts it into a form suitable for output to DISP 105, and outputs it to DISP 105.

GF 121 is a representation of RS 113 currently being processed in which data values contained in RS 113 are represented solely by means of codes for displayable characters. Any information about the relationship of the data values to each other in GF 121 is represented by means of the arrangement of the displayable character codes representing the data. The displayable character codes are codes which directly represent a symbol such as a blank, a punctuation mark, a number, or a letter. For example, in the ASCII code set employed in a preferred embodiment, the displayable characters are the characters in the range of value between decimal 32 and decimal 126. Excluded from the displayable characters are codes specifying such things as tabs, new lines, carriage returns, or form feeds, since these codes do not directly represent a symbol.

Operation of the data exchange apparatus of the present invention is as follows: CPU 101, operating under control of SGP 119, selects logical record 113(c), retrieves logical record RS 113(c) from FS 111 to buffer 127, transforms the data values contained therein into displayable characters, and produces GF 121 by arranging the displayable characters in a fashion suited to indicating whatever relationships existed between the values in RS 113(c). Next, CPU 101, operating under control of GDP 125, takes GF 121 and uses the arrangement of values contained therein to form a logical record RD 117 of the type required for FD 115 in buffer 129. Logical record 117 is formed by transforming the data values contained in the displayable characters into values having the representation proper for RDs 117 and adding whatever other codes or values are necessary to put the values from GF 121 into the proper form for FD 115. The contents of buffer 129 is then output as a selected logical record of FD 115. In some embodiments, FS 111 or FD 115 may be stored in a location remote to the computer system in which the data exchange operation is being performed. In these embodiments, SGP 119 may produce GF 121 from the contents of a protocol by which the contents of RS 113(c) is transferred, instead of directly from RS 113(c), and GDP 125 may produce a protocol from GF121 instead of RD 117(c). In this case, software in the remote location will produce RD 117(c) from the protocol.

In a preferred embodiment users of the data exchange apparatus of the present invention can specify FS 111 and FD 115, which RSs 113 they wish to exchange and can specify whether the RDs 129 produced from GF 121 are to be placed in a new FD 115 or appended to an existing FD 115. When GF 121 contains values belonging to a plurality of fields, the user can specify an arbitrary 1-byte code to be placed before the value representing the field in GF 121. When that feature is specified, SGP 119 inserts the specified code ahead of the value when it creates GF 121. The user can further specify that GDP 125 add a return code to RD 117 at the end of the values received in RD 117 from GF 121.

Other factors which the user may specify in certain cases include the length of RS 113 obtained from a stream file, the number of lines per page, and whether FD 115 is to be printed. In the latter case, the user may specify the print format.

In a preferred embodiment, the user controls the data exchange apparatus and specifies the items described above interactively from TERM 104. The interactive control and specification is carried out in a preferred embodiment by means of screens with fields to be filled in by the user, menus from which the user may select alternatives, and function keys, some of which are specified on the screens. In other embodiments, control may be by other means such as a command line with arguments specifying the items or a command file specifying the items. In still other embodiments, finally, the data exchange may operate in batch mode.

In addition to being useful in the data exchange apparatus described above, GF 121 is useful in data view apparatus for viewing logical records RS 113 from a FS 111. The components of that apparatus in FIG. 1 include buffer 127, SGP 119, GF 121, and viewdata program (VD) 123. The data processing system of FIG. 1 functions as the data view apparatus when operating under control of VD program 123. In a preferred embodiment, the user of the data view apparatus controls it interactively from Term 104 using screens and function keys in the fashion described for the data exchange apparatus and the RSs 113 viewed using the apparatus appear in screens on DISP 105. Operation of the viewdata apparatus is as follows: operating on FS 111 specified by the user at Term 104 and beginning with an RS 113 specified by the user, VD 123 calls SGP 119, which retrieves the specified RS 113(c) and produces GF 121 therefrom as previously described. VD 123 then receives GF 121, performs any formatting thereon necessary for DISP 105, and then outputs GF 121 to DISP 105. Under interactive control, VD 123 permits the user of the data view apparatus to view selected RSs 113 from FS 111 and to further move back and forth within the selected RSs 113.

Figure 2:
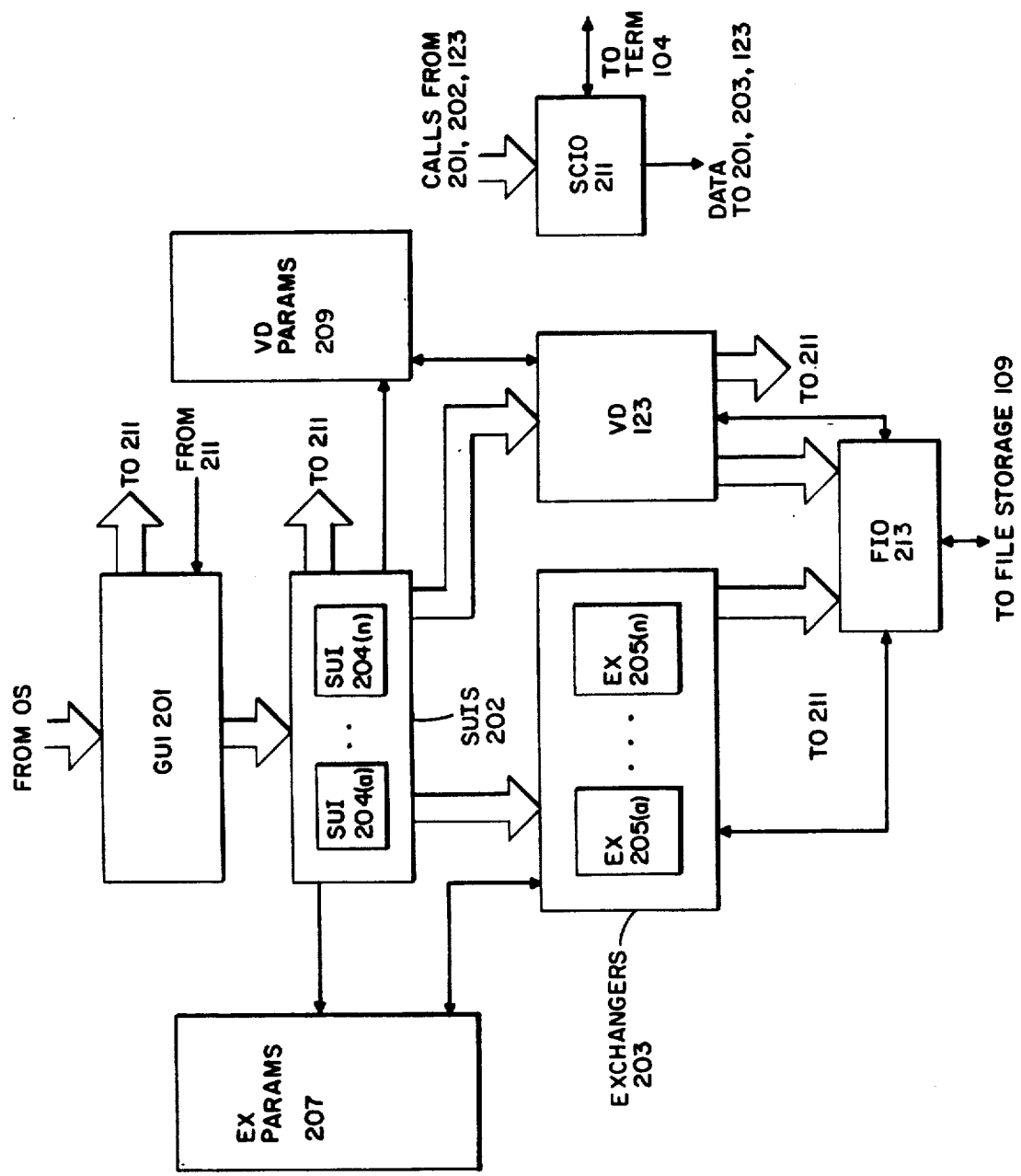
FIG. 2 is a block diagram overview of a preferred embodiment of the data exchange apparatus of the present invention.

2. Overview of a Preferred Embodiment of the Data Exchange Apparatus: FIG. 2

FIG. 2 is a high-level block diagram of the data exchange apparatus of the present invention. In FIG. 2, calls from one program module to another program module are represented by broad arrows; transfer of data between program modules and between program modules and data structures are represented by single-line arrows. The components of FIG. 2, all of which are understood to be resident in MEM 103 of the computer system of FIG. 1, are the following: program module screen I/O (SCIO) 211 which contains I/O routines for outputting data to and receiving data from TERM 104. SCIO 211 is called whenever a module wishes to output a screen to TERM 104 and read data from the screen. File I/O (FIO) 213 contains I/O routines for outputting data to and receiving data from files in file storage 109 and is called whenever a module wishes to receive a physical record from or write a physical record to file storage 109. In most embodiments, SCIO 211 and FIO 213 will be standard library routines. General user interface (GUI) module 201 is a program module which is the first program executed by a user of a preferred embodiment and thus serves as the user interface to the preferred embodiment. Special use interfaces (SUIS) 202 is a set of special user interface (SUI) program modules 204. Each SUI program module 204 corresponds to a set of file type combinations for the input and output file types. Exchangers 203 is a set of exchange (EX) program modules 205 for dealing with source files FS 111 and destination files FD 115 having different combinations of file types. Modules in the set are differentiated by subscripts. VD 123 is a viewdata program module. Data structures of interest at the level of the overview include EX params 207, which contains parameter values used to control execution of a given EX 205 program module, and VD params 209, which contains parameter values used to control execution of VD 123. EX params 207 and VD params 209 are accessible to both GUI 201 and Exchangers 203 and VD 123, and are consequently used to pass data from UI 201 to those modules.

In a preferred embodiment, GUI 201 is invoked by a user from an operating system routine which receives user commands. On invocation, GUI 201 allocates space in MEM 103 for params 207 and 209 and then invokes SCIO 211 to output a screen to TERM 104 which requests that the user indicate what type of file he wishes to use as a source and what type he wishes to use. When the user has selected his input and output file types, GUI 201 invokes the proper SUI 204 for the selected combination of file types. The combination of file types is passed into SUI 204 as an argument. The invoked SUI 204, specified hereinafter as SUI 204(a), then invokes SCIO 211 to output a screen to TERM 104 which requests that the user specify FS 111 and FD 115 for the data exchange and further permits him to specify other optional and required parameters for the exchange. Additionally, SUI 204 permits the user to specify that he wishes to execute VD 123.

When the user specifies a data exchange, SUI 204(a) places the parameter values specified by the user in EX params 207 and invokes the proper EX 205 module, here specified as EX 205(a), for the selected combination of file types. EX 205(a) then employs the parameters contained in EX params 207 to perform the data exchange using GF 121 as will be described in more detail hereinafter. As shown in FIG. 2, EX 205(a) performs file operations involved in the data exchange by invoking routines in FIO 213 for the types of files involved.

When the user specifies execution of VD 123, SUI 204(a) places the parameter values specified by the user in VD params 209 and then invokes VD 123 which employs the parameters contained in VD 209 to produce a display of logical records from FS 111. VD 123 produces the display using GF 121 as will be described in more detain hereinafter. As was the case with EX 205(a), VD 123 performs the necessary file operations by invoking FIO 213. VD 123 invokes SCIO 211 to produce the display.

Figure 3:
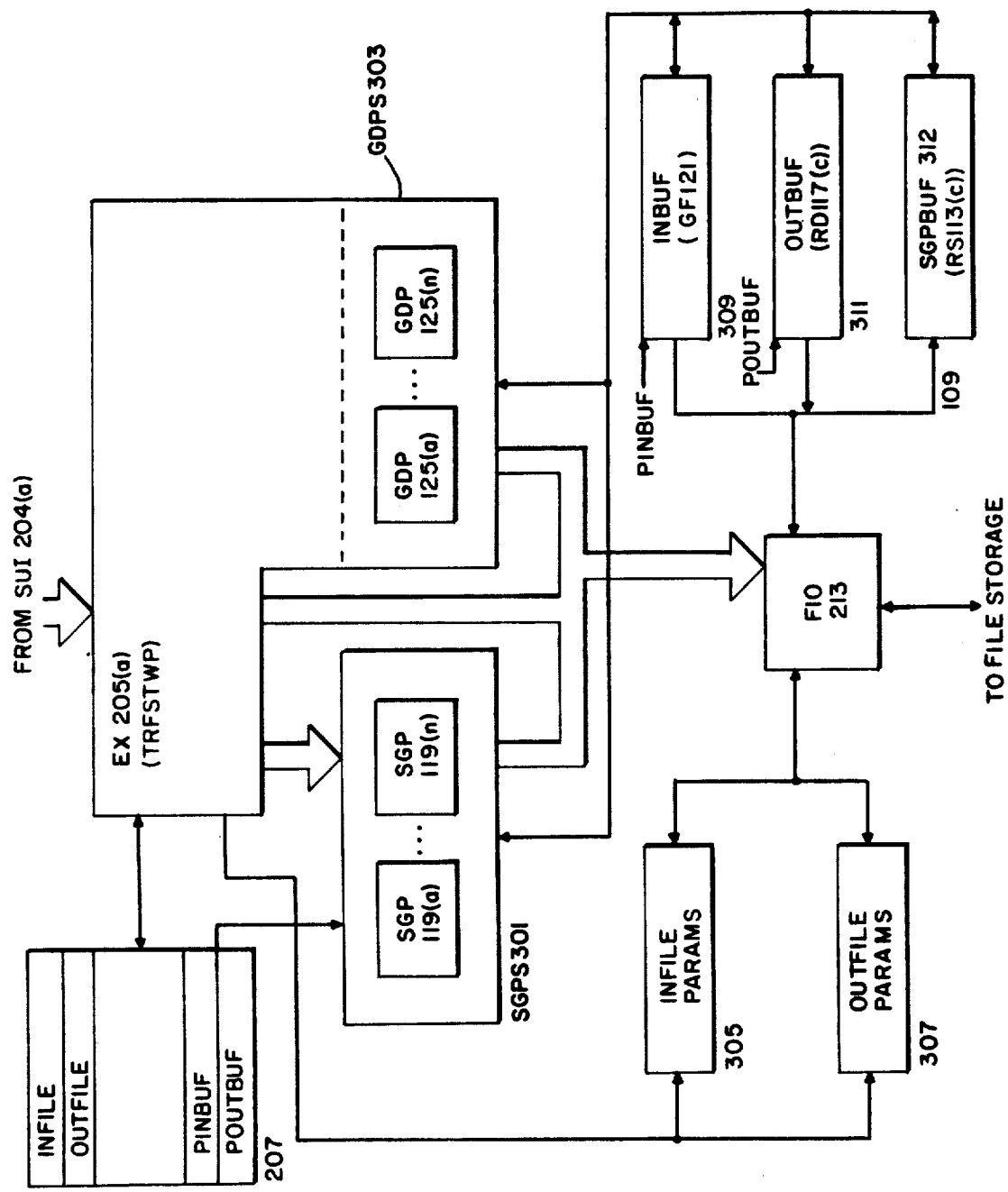
FIG. 3 is a block diagram of EX 205(a) in a preferred embodiment.
Figure 4:
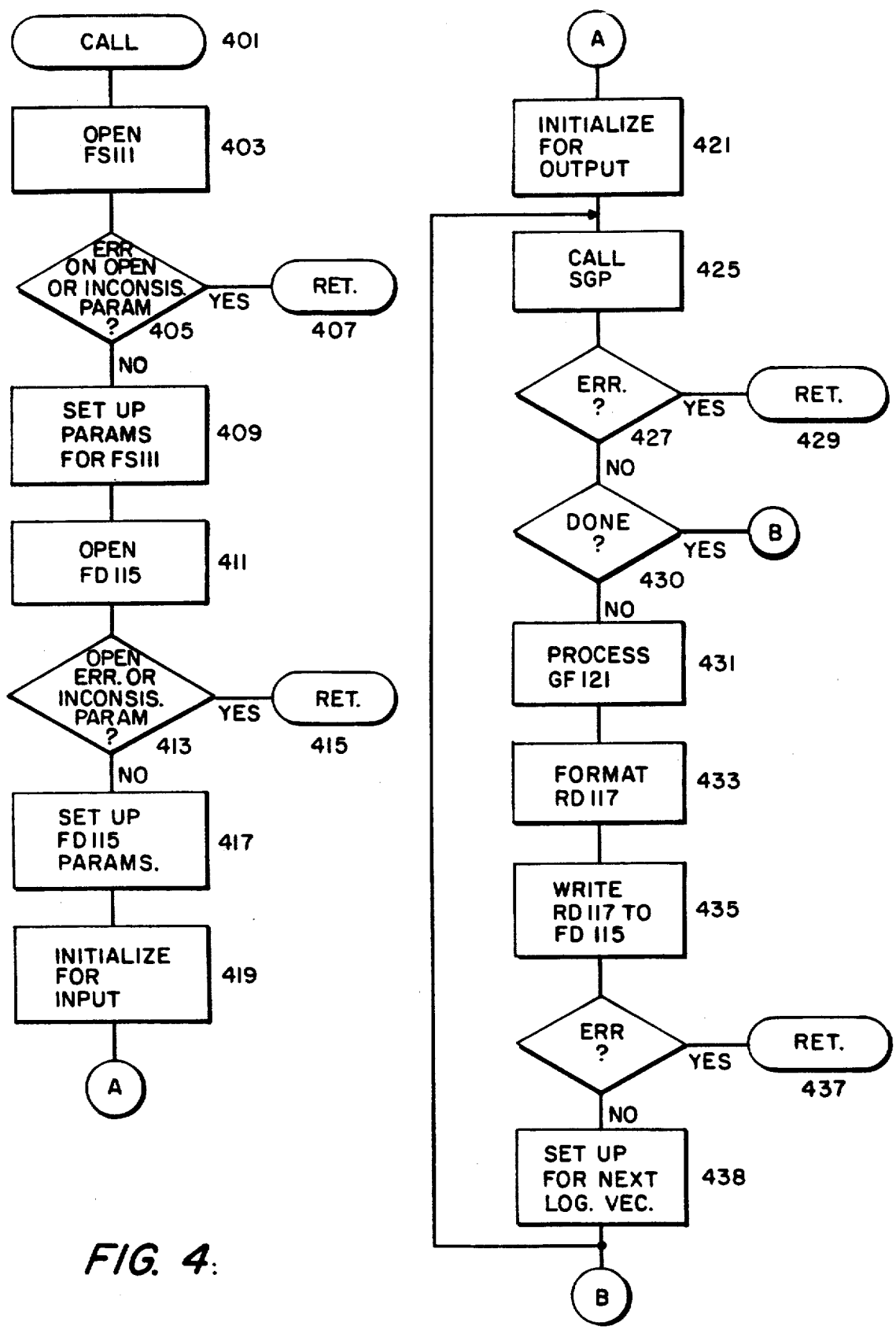
FIGS. 4 and 4A are a flow chart of the operation of EX 205(a)
Figures 4A, 7:
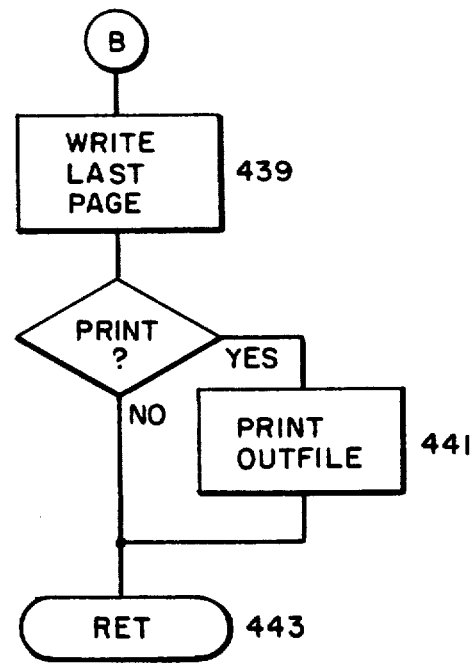
FIG. 7 is an example of a spread sheet row in a SYLK file.

3. Preferred Embodiment of EX 205(a): FIGS. 3-4A

EX 205(a) may serve herein as an example for any of the EXs 205 in is a program module named trfstwp which exchanges data between source files having certain record, stream, and record and field file types and destination files having certain document file types. The following description of EX 205(a) will describe how EX 205(a) is employed to exchange data between a SYLK file and a WP+ document file. One skilled in the art may easily apply the principles and techniques disclosed in the discussion of EX 205(a) to produce EXs 205 for other combinations of source file types and destination file types.

FIG. 3 is a block diagram of a preferred embodiment of one of Exchangers 203, EX 205(a). Again, all of the components are understood to be program modules and data structures in MEM 103. EX 205(a) makes use of certain components of the invention which have been previously described, namely EX params 207 and FIO 213. Additional components are SGPS 301, GDPS 303, INFILE params 305, OUTFILE params 307, INBUF 309, OUTBUF 311, and SGPBUF 312.

Beginning with EX params 207, the parameter values therein which are of interest for the present discussion are the following:

intype, which specifies the file type of source file FS 111;
outype, which specifies the file type of destination file FD 115;
infile: a pointer to the name of FS 111;
outfile: a pointer to the name of FD 115;
insert: a flag indicating that a specified character code should precede the displayable characters representing a spread sheet cell;
inchar: the character code which is to precede the displayable characters representing a spread sheet cell;
retchar: append a return character to GF 121 when producing RD 117;
nlines: the number of lines per page in the WP+ document;
tabs: the number of columns between tabs on the format line;
flen: the length of the format line;
scratch: a flag indicating whether an existing output file should be deleted and a new one created;
pinbuf: pointer to an input buffer;
poutbuf: pointer to an output buffer.

SUI 204(a) provides the values of pinbuf and poutbuf to EX params 207; SUI 204(a) sets the remainder of the values in a preferred embodiment from values received from the user of the data exchange apparatus in the manner previously described. If a user fails to provide a parameter, SUI 204(a) may give the parameter a default value.

Continuing with SGPS 301, in a preferred embodiment, this is a collection of program modules SGP 119(a)...(n), Each program module SGP 119 corresponds to a single file type and produces GF from a selected logical record of that file type, employing FIO 213 to perform the necessary file I/O. EX 205(a) invokes a given SGP 119 as required by the value of the intype parameter of EX params 207. GDPS 303 is a collection of portions of EX 205(a). Each portion, indicated by GDP 125(a)...(n) corresponds to a single file type and produces a logical record for that file type from GF 121, employing FIO 213 to perform the necessary file I/O. EX 205(a) determines which GDP 125(a) to execute from the value of the outype parameter. In other embodiments, GDPs 125 may be program modules invoked by EX 205(a) and SGPs 119 may be portions of EX 205(a).

INFILE params 305 are parameters used by FIO 213 in its operations on source file FS 111; OUTFILE params 307 are parameters used by FIO 213 in its operations on destination file FD 115. The parameters will vary depending on the file type, but will include at least the file names, the location in MEM 103 to which the data is to be read from the input file, and the location in MEM 103 from which the data is to be written to the output file. In a preferred embodiment, the input and output file names and the locations to which data is to be read and written are specified by the EX params infile, outfile, pinbuf, and poutbuf respectively.

Continuing with the buffers in MEM 103 INBUF 309, OUTBUF 311, and SGPBUF 312, SGPBUF 312 is a buffer which is used by whatever SGP 119 is invoked by EX 205(a) to receive RS 113 currently being worked on. It thus corresponds in function to buffer 127 of FIG. 1. INBUF 309 receives GF 121 produced from RS 113 in SGPBUF 312 and thus implements GF 121 of FIG. 1. OUTBUF 311 is a buffer in MEM 103 which receives logical record RD 117 produced from GF 12 in INBUF 309. OUTBUF 311 thus implements buffer 129 of FIG. 1.

As may be seen from the broad arrows specifying invocations in FIG. 3, EX 205(a) invokes modules in SGPS 301 and FIO 213; as shown by the single arrows specifying data flow, EX parameters flow between EX 205(a) and EX params 207, from params 207 to SGPS, I/O parameters from EX 205(a) to I/O params 305 and 307, RS 113 is input by FIO 213 from FS 111 to SGPBUF 312 and from there to SGPS 301, which produces GF 121 from RS 113, GF 121 flows from SGPS 301 to INBUF 309 and from there to GDPS 303, which produces RD 117 from it, and places RD 117 in OUTBUF 311, from whence FIO 213 outputs it to FD 116.

Operation of a preferred embodiment of EX 205(a) is presented in the flow chart of FIGS. 4 and 4A. Beginning with FIG. 4, execution of EX 205(a) begins with a call from SUI 204(a). EX 205(a) then opens the input file specified by the infile parameter of params 207 using FIO 213 (block 403) and checks the parameters in params 207 to make sure that they are consistent with those required for the file type specifed by the intype parameter. If there was an error on the file open or the parameters are inconsistent, EX 205(a) places an error code in params 207 and returns (blocks 405, 407). If there was no error, EX 205(a) sets up INFILE params 305 using parameters from params 207 and other values as required by the type of FS 111. EX 205(a) then performs a parallel set of operations for destination file FD 115, as specified in blocks 411 through 417. If FD 115 does not exist, EX 205(a) invokes FIO 213 routines to have it created; if FD 115 does exist, EX 205(a) either deletes it, if the scratch parameter of params 207 so indicates, or opens it for appending. The next steps are initialization for input (block 419) and initialization for output (block 421. The actions performed here are dependent on the types of the input and output files. The initialization for input is generally simply a matter of setting the file pointer for FS 111 to specify the first item in logical record RS 113 being read; the initialization for output may for example involve setting up a format line for a document using the tabs and flen parameters from params 207. Conceptually, such initialization belongs to GDP 125 for the output file type.

Thereupon, EX 205(a) commences execution of read-write loop 423. On each execution of the loop, one RS 113 is read from FS 111, a GF 121 is produced therefrom, a RD 117 is produces from GF 121, and the RD 117 is output to FD 115. Execution continues until all of the RSs 113 specified have been exchanged, the end of FS 111 has been reached, or an error occurs. In the former cases, execution continues at the point marked B; in the later case, EX 205(a) places an error value in params 207 and returns. The first step in loop 423 is invoking the SGP 119 required for the type of FS 111 specified by the intype parameter. That SGP 119 employs FIO 213 to retrieve logical record RS 113 being exchanged, here termed RS 113(c) from FS 111 to INBUF 309, produces GF 121 from RS 113(c), places GF 121 in INBUF 309, and returns (block 425). If an error occurs during execution of the SGP 119, EX 205(a) places an error value in params 207 and returns (blocks 427, 429), if RS 113(c) was beyond the last record to be exchanged or if there were no more RS 113s, EX 205(a) branches to the portion of the flow chart labelled B (block 430).

The next stages again belong conceptually to GDP 125 for the file type of FS 111. First, GF 121 is processed to make sure that the displayable characters it does contain are of the type used in FD 115 (block 431). For example, SYLK files contain ASCII characters, while WP+ files use an expanded character set called the WISCII character set. Thus, in an exchange from SYLK to WP+, this step converts the ASCII characters of GF 121 to WISCII characters. The next step is to format RD 117 from GF 121 (block 433), and thereupon to write it to FD 115 using FIO 213 (block 435). If a write error occurs, EX 205(a) writes an error code to params 207 and returns (blocks 436 and 437). Otherwise, EX 205(a) sets up to retrieve the next RS 113 and branches to block 425 to repeat execution of read-write loop 423 (block 438).

Continuing with FIG. 4A, when block 430 terminates loop 423 by branching to location B, all RSs 113 to be exchanged have been successfully converted to RDs 117; however, in a preferred embodiment of EX 205(a), FIO 213 outputs RDs 117 to FD 115 a page at a time when FD 115 is a document file. Consequently, upon termination of loop 423, block 439 writes the last page to FD 115. Further, a screen of GUI 201 permits the user of the data exchange apparatus of the present invention to specify that he wishes FD 115 to be printed and to specify the format in which he wishes it to be printed. Params 207 contain the requisite parameters, and if the user has specified that FD 115 be printed (block 440), it is printed in the specified format (block 441). Having finished, EX 205(a) then returns to SUI 204(a) (block 443).

4. Preferred Embodiment of SGP 119(a): FIGS. 5-9B

As with EX 205, a single exemplary SGP 119, referred to hereinafter as SGP 119(a) will be described in detail. SGP 119(a) is a program module named sylkread which produces a GF 121 containing the values from a single row of the spread sheet represented by a FS 111 having the SYLK type. One skilled in the art may easily apply the principles and techniques disclosed herein to produce GPs 119 for other types of FS 111.

5. Description of SYLK Files: FIGS. 6-8

Since the structure and operation of SGP 119(a) is dependent on the structure of a SYLK file, the discussion of SGP 119(a) will commence with a discussion of a SYLK file as shown in FIGS. 6-8. As previously pointed out, SYLK files are used to represent MULTIPLAN spread sheets. In a spread sheet, data and programs are represented as a table of rows and columns. At the intersection of each row and column is a cell. The cell may contain a data value or a formula by which a data value ma be computed using values contained in other cells and the current value of the formula. In the formula, the values used in the computation are represented by their row and column numbers.

FIG. 6 shows a typical SYLK file, SYLKF 513. SYLK 513 consists of a sequence of SYLK records (SRECs) 515. Each SREC 515 ends with an SREC terminator (SRECT) 601 consisting of a line feed character. Each SREC 515 contains at least one byte identifying the type of the SREC 515. If the SREC 515 contains values, each value is preceded by a value type code consisting of the ASCII code for ";" followed by a character code. The SRECs 515 in SYLKF 513 include ID 603, a record which identifies SYLKF 513, B 605, which specifies the bounds of the rows and columns, an E record which marks the end of SYLKF 513, and most importantly, C records, which represent cells, and F records, which represent the format for a cell.

Each C record specifies the row and column location of the cell it represents and the present value of the cell. The C record begins with C type code 607; if the C record occupies a different row or column from the preceding C record, it will specify the differing row or column location by means of an ;X column code 609 and an X value 611 or ;Y row code 613 and a Y value 615, and further codes indicating a value for the field. Y value 615 and X value 611 specify the location of the cell in the spread sheet. There nee be no relationship whatever between the physical position of a C record in SYLKF 513 and its location in the visual representation of the spreadsheet represented by SYLKF 513.

The simplest way in which the value for the field can be specified is by means of a ;K code 617 followed by a K value 619. The ;K code specifies that K value 619 is the current value of the cell. If the cell's value is dependent from a formula, the formula is represented by an ;E code 621, followed by an E value 623 consisting of the ASCII characters representing the formula, followed by a ;K code 617 and a K value 619 specifying the value of the formula at the time SYLKF 513 was created. The cell's value may also be found in another cell; in that case, the value is represented by a ;S code 635 followed by a ;R code 637 and a R value representing the row of the cell containing the value and a ;C code 641 and a C value 643 representing the column of the cell containing the value.

Format records may be of two types: default format records which indicate the formats for an entire spread sheet, and local format records which indicate the format of a specific row, column, or cell. The record begins with F code 625. If the record is a default format record, it continues with a ;D code; if it is a local format record, it continues with a ;F code 677. Both the ;D and ;F codes are followed by format value codes 629 which specify the kind of formatting, the number of digits in the format, and the alignment of the value in the field. In the case of the local format record, value codes 629 are followed by ;X and ;Y or ;R or ;C codes and values indicating what cells the format applies to.

FIG. 7 shows the SYLK representation of a single row having the following form in the spreadsheet:

"ATTENBERGER, T M" "66-66666666" 18094.12
18520.2

The row is presumed to be the third row of the spreadsheet. As can be seen from the figure, the representation consists of four C records and two format records. Since the second, third, and fourth C records represent columns in the same rows, they have no ;Y values. The format records are for the first two columns; the remaining columns are presumed to have the default format.

FIG. 8 represents two forms of GF 121 produced from the SYLK row of FIG. 7. At reference number 801 is seen GF 121 when the user of the data exchange apparatus has not specified a character to be inserted between cell values. Here, GF 121 consists solely of displayable characters. The cell values are separated solely by blanks specified in the SYLK formats. At reference number 803 is seen the same SYLK row when the user specified that an insertion character, IC 805, be inserted between cell values.

Figure 5:
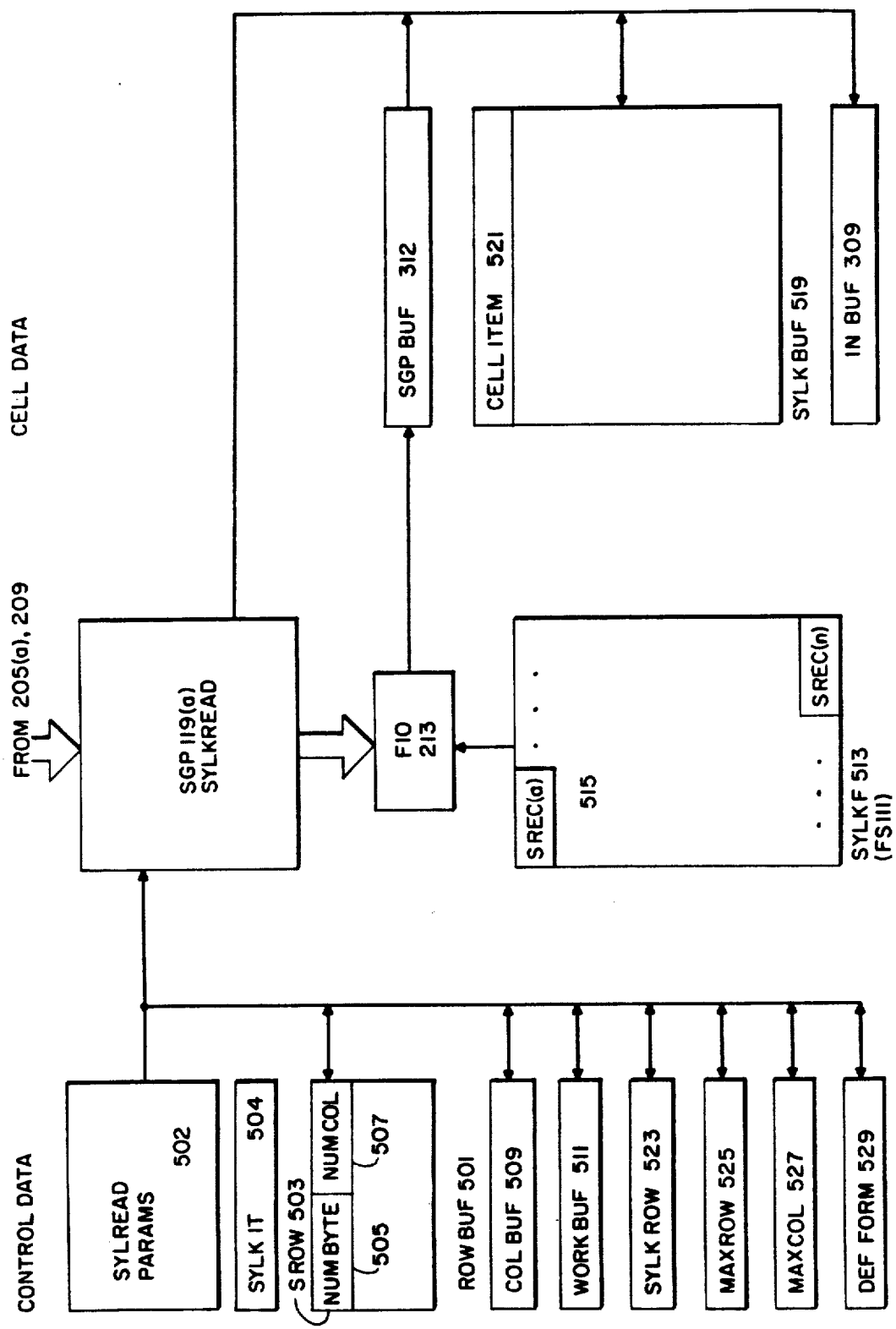
FIG. 5 is a block diagram of GP 119(a) in a preferred embodiment.

6. Structure of a Preferred Embodiment of SGP 119(a): FIG. 5

Continuing now with the discussion of the structure and operation of SGP 119(a), FIG. 5 is a block diagram of a preferred embodiment. SGP 119(a) is the sylkread program module and FIO 213 is the file I/O routines required to read SYLK records (SRECs) 515 from SYLK file (SYLKF) 513, which is FS 111 for SGP 119(a). While SGP 119(a) is working on a SYLK row, it uses the buffers labelled Cell Data. SGPBUF 312 receives each SREC 515 from SYLKF 513; SGP 119(a) assembles the SYLK row which eventually will form GF 121 in INBUF 301 in SYLKBUF 519, an array of 64 strings (CELLITEM 521). Each CELLITEM 521 contains the displayable characters representing one SYLK cell and the order of the CELLITEMs 521 in SYLKBUF 519 corresponds to the order in which the cells occur in the row. When an entire SYLK row is assembled in SYLKBUF 519, SGP 119(a) outputs it to INBUF 309, inserting any character code specified by the user ahead of each CELLITEM 521 or in place of any empty CELLITEM 521.

Operation of SGP 119(a) is controlled by the data structures termed control data in FIG. 5. Sylread params 502 contains parameters set up by EX 205(a) before it invoked SGP 119(a). The parameters include the following:

read_fd: the file identifier for SYLKF 513, received from params 207;

read_pbuf: a pointer to INBUF 309, received from params 207;

read_row: the number of the SYLK row from which SGP 119(a) has just produced GF 121;

read_insert: a flag from params 207 indicating whether a user-defined character is to be inserted between SYLK cell values in GF 121;

read_inchar: the character to be inserted, from params 207;

read_type: an array which has an element corresponding to each cell within a row. The element's value indicates whether the cell's data is text or numeric.

read_errnum: value of any error generated by SGP 119(a).

SYLKIT 504 is a flag which indicates whether this is the first time SGP 119(a) has been invoked. ROWBUF 501 is an array of structures SROW 503 which SGP 119(a) uses to avoid having to search through all of SYLKF 513 to assemble a row of the spread sheet. Each row of the spreadsheet is represented by an SROW 503, and each SROW 503 contains two elements: NUMBYTE 505, which contains the location in SYLKF 513 of the first record in SYLKF 513 which belongs to a cell in the row, and NUMCOL 507, which contains the column number of that cell.

COLBUF 509 is an array which has an element for every column of a row and is used to keep track of whether processing the any cell corresponding to that column has been completed. WORKBUF 511 is an array like COLBUF 509 which is used to keep track of whether there is a cell in a column. SYLKROW 523 indicates the spread sheet row currently being operated on by SGP 119(a). MAXROW 525 contains the maximum row number in the spread sheet represented by SYLKF 513 and MAXCOL 527 keeps track of the maximum column number in the spread sheet. DEFFORM 529 save the default format information for the spread sheet.

Figure 9:
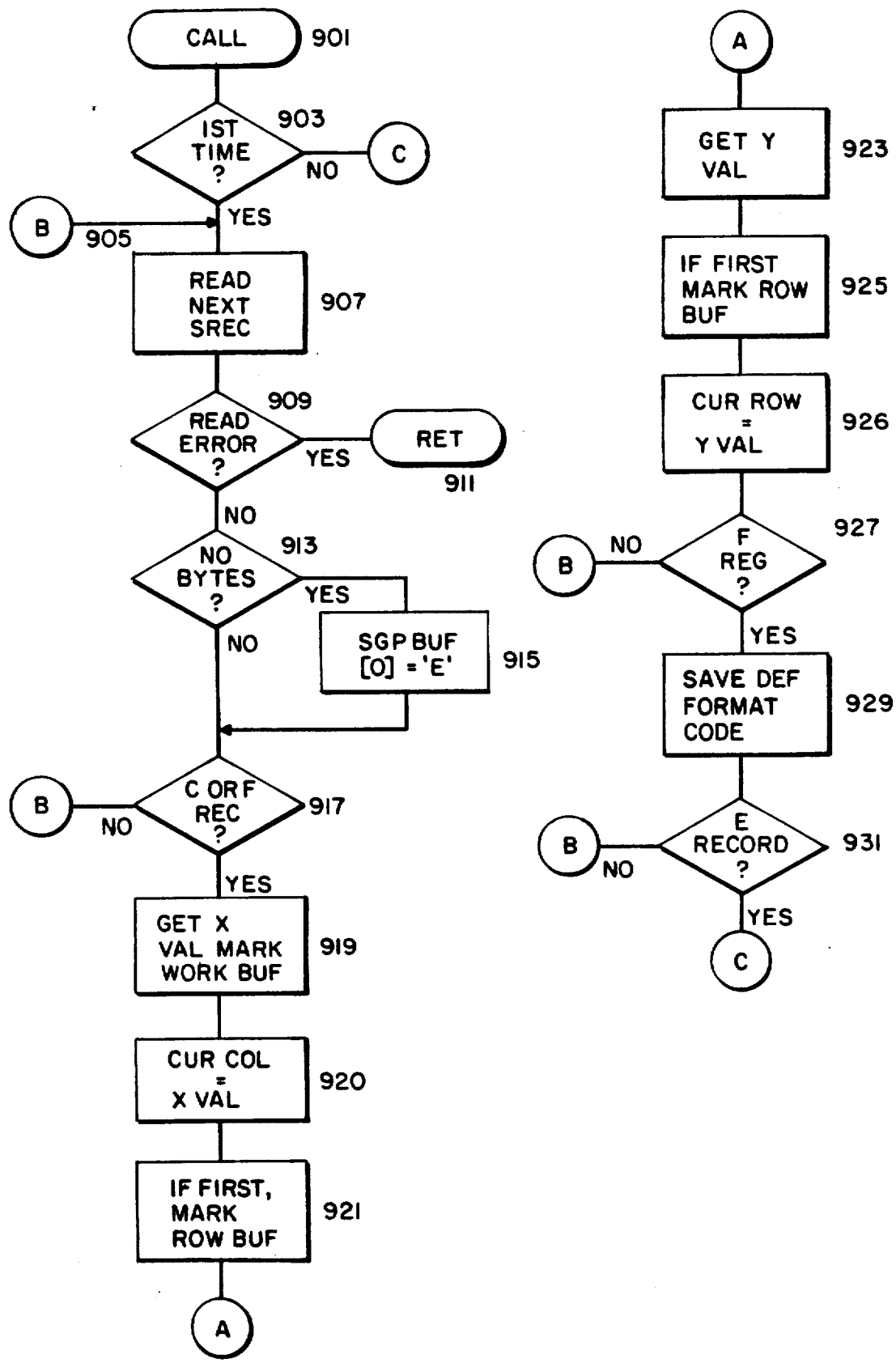
FIGS. 9, 9A, and 9B are a flow chart of the operation of GP 119(a)

7. Operation of SGP 119(a): FIGS. 9-9B

In overview, SGP 119(a) operates as follows: the first time it is invoked by EX 205(a), it reads through SYLKF 513 from beginning to end. Each time it encounters a SREC 515 which has the C or F types, it determines the SREC 515's row and column location from its ;X and ;Y fields. If the SREC 515 is the first one in SYLKF 513 for a given row, SGP 119(a) creates an entry for the SREC 525 in ROWBUF 501 specifying the SREC 515's position in SYLKF 513 and its column number and marks WORKBUF 511 to indicate that there is a cell in that column. Further, when SGP 119(a) encounters a default format record, it places the default format information in DEFFORM 529. Having thus read through SYLKF 513, SGP 119(a) sets SYLKIT 504 to indicate that there already has been one invocation and then goes on to format the first row in the spreadsheet. SGP 119(a) locates the first row by finding the first SROW 503 in ROWBUF 501 whose NUMBYTE field 505 has a value less than 0. It then reads the SREC 515 specified by that field and if it is a C record, extracts ;K value 617 from the record and formats it as required by either the default format record or the relevant local format record. The formatted ;K value is then output to cell item 521 corresponding to the column number specified by the C record's ;X field. SGP 119(a) then works through the remainder of SYLKF 513 looking for the rest of the C records for the row and outputting the formatted ;K values to their corresponding CELL ITEMs 521 in SYLKBUF 519. After SGP 119(a) has located all of the C records for the row, it outputs them from SYLKBUF 519 to INBUF 309 and returns.

A more detailed description of the operation of SGP 119(a) is contained in the flow chart of FIGS. 9-9B. Execution of SGP 119(a) begins with its invocation in block 425 of FIG. 4 (block 901). The first step is testing SYLKIT 504 to determine whether this is the first invocation of SGP 119(a). If it is not, execution continues at the point marked C (block 903). If it is, SGP 119(a) commences execution of loop 905, which marks ROWBUF and WORKBUF to indicate rows with cells. The first step in loop 905 is to read the next SREC 515 (block 907). As previously mentioned, SRECs 515 are terminated by SRECT 601, and the read operation simply reads everything from the present location in the file to the next SRECT 601 into SGPBUF 312. If there is a read error, an error number is placed in SYLREAD params 502 and SGP 119(a) returns (blocks 909, 911). If no bytes have been read, the end of SYLKF 513 has been reached and SGPBUF[0' is set to 'E', just as if the E record at the end of SYLKF 513 had been reached (blocks 913, 915). Next, the SREC 515 is examined to determine whether it is a C or an F record. If it is not, SGP 119(a) branches to block 907 and reads the next SREC 515 (block 917); if it is, SGP 119(a) examines SREC 515 to determine whether it has an ;X or a ;Y field, indicating that a row or column value has changed in the C or F record. If there is an ;X field, SGP 119(a) marks the WORKBUF 511 element corresponding to the X value to indicate that that column has cells, updates the current column value to the new X value, and then, if ROWBUF 501 for the row specified by the Y value has as yet NUMBYTE 505=0, indicating that SREC 515 is the first SREC 515 for a row, marks NUMBYTE 505 for the row with the position of SREC 515 and NUMCOL 507 with the column number specified by the X value (blocks 919-921). If there is a ;Y field, SGP 119(a) performs the same activities for the Y value (blocks 923-926).

If SREC 515 is not a format record, SGP 119(a) continues at block 907; if it is a default format record, SGP 119(a) sets DEF FORM 529 from format value 629 in the record (block 929). Finally, unless the contents of SGPBUF 312 indicate an E record, specifying the end of SYLKF 513, SGP 119(a) repeats loop 905 and returns to block 907 to read the next SREC 907.

Figure 9A:
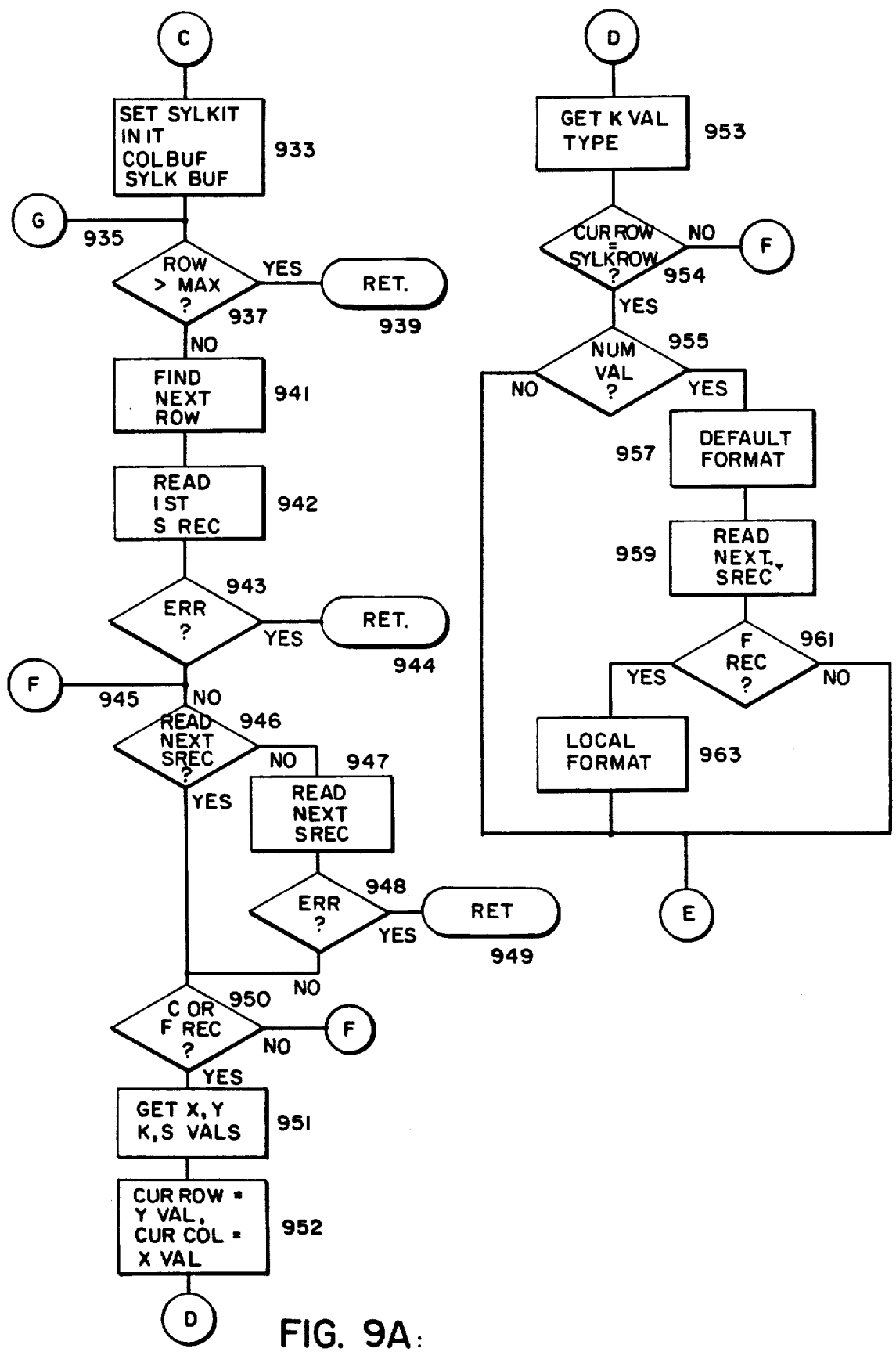
Figure 9B:
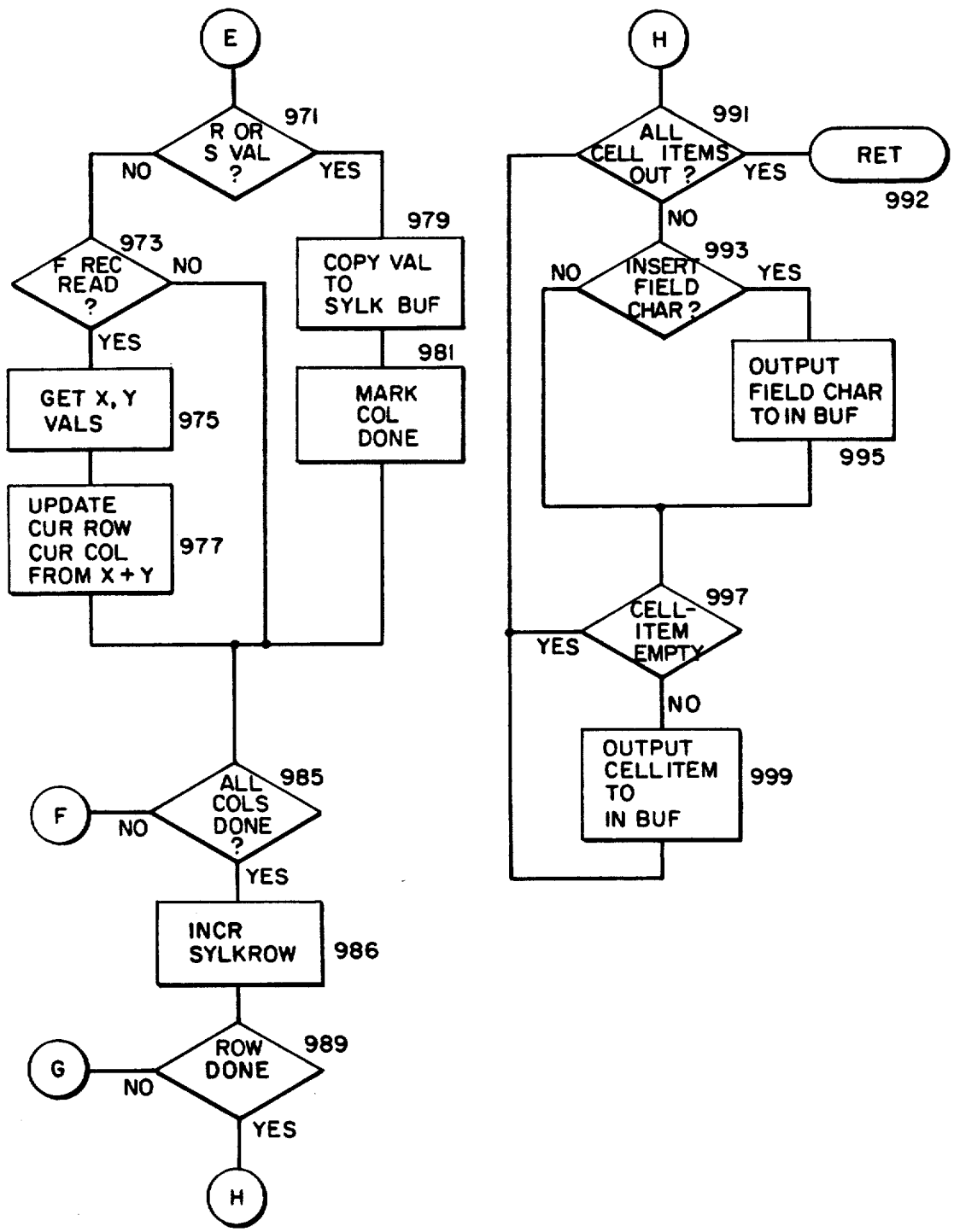

Continuing with point C in FIG. 9A, on completing loop 907, SGP 119(a) sets SYLKIT 504 to indicate that SGP 119(a) has been invoked once sets COLBUF 509 from WORKBUF 511 so that COLBUF 509 indicates which columns of the spreadsheet have cells, and clears SYLKBUF 519 (block 933). SGP 119(a) then begins execution of loop 935, which continues until the next row of the spread sheet which contains cells with values has been output and then returns. The first step is to check whether the row to be processed is beyond the last row in the spread sheet. If it is, SGP 119(a) returns the value 0 (blocks 937, 939). Next, SGP 119(a) finds the next row whose cells have values. This is done by examining ROWBUF 501 beginning with the last row output until the next SROW 503 is found whose NUMBYTE field 505 does not equal 0 (block 941). The number of the row currently being examined is kept in the static external variable SYLKROW 523, which is incremented each time a row has been completely processed.

SGP 119(a) then uses the location of the first SREC 515 in the row from NUMBYTE 505 for the row to read that SREC 515 into SGPBUF 312 (block 942). If there is a read error, SGP 119(a) indicates an error and returns (blocks 943, 944). SGP 119(a) then enters nested loop 945, which continues executing until all of the SRECs 505 associated with a given cell have been located and processed. On entry into loop 945, SGP 119(a) tests whether the next SREC 515 to be processed has already been read into SGPBUF 312. If this is the case, no further read is necessary; if it is not, SREC 515 following the last SREC 515 read is read into SGPBUF 312 and read errors handled as described above (blocks 946-949).

Next, SGPBUF 312 is examined to determine whether the record it contains is a C or F SREC 515. If the record is not one of these, SGP 119(a) branches to block 946 and reads the next SREC 515 (block 950). If the record is one of these, SGP 119(a) examines SGPBUF 312 for ;X 609, ;Y 613, ;K 617, or ;S 635 codes; if it finds any, it stores the corresponding X, Y, K, or S values, sets flags indicating what kinds of values were stored, sets a current row variable to the Y value and a current column value to the X value, and saves a value representing the data type of the saved K value (blocks 951-953). It then compares the value of the current row variable with the value of SYLKROW; if they are not the same, SREC 515 is not part of the row currently being processed amd SGP 119(a) branches to block 946 (block 954).

The next step is to do any formatting necessary for arithmetic K values. As can be seen from blocks 955-963 of FIG. 9A, SGP 119(a) first checks whether there is a K value and whether the K value is arithmetic. If it is, it formats the k value in accordance with the default format in DEF FORM 529 and saves the formatted value. SGP 119(a) then reads the next SREC 515; if it is an F record, it formats the K value in accordance with the local format specified in the F record and replaces the default formatted value with that formatted value. If the next SREC 515 is not an F record, it becomes the next SREC 515 to be processed by loop 945.

Continuing with FIG. 9B, SGP 119(a) first consults the flags to determine whether an S or a K value was saved (block 971). If it was, the value is placed in CELLITEM 521 of SYLKBUF 519 corresponding to the current value of SYLKROW 523 and the WORKBUF 511 element corresponding to the column is set to 1, indicating that the column has been processed (blocks 971-981). If no such value was saved, but an F SREC 515 was read for local formatting, the X and Y values in the F record are read and currow and curcol are updated from them as described with regard to blocks 951 and 952 (blocks 973 through 977).

Next, SGP 119(a) examines WORKBUF 511 to determine whether all of the cells in the row have been processed (block 985); if not, loop 945 is repeated. If they have been, PSYLKROW is incremented (block 986). If the row is finished, SGP 119(a) goes to point H; otherwise, it repeats loop 935 (block 989). As can be seen from blocks 991, 993, 995, and 999, the remainder of SGP 119(a) is a loop which goes through SYLKBUF 519 in order and outputs the contents of any CELLITEM 521 which is not empty to INBUF 309. If the parameter read.insert indicates that the character specified by the parameter in.char is to be inserted ahead of each cell and in place of an empty cell, that insertion is performed by blocks 993 and 995. When all of the cells in SYLKBUF 519 have been output, the loop terminates and SGP 119(a) returns.

As will be clear to one skilled in the art, the methods and techniques of SGP 119(a) may be used to produce GF 121 from any file having a record and field type. Moreover, analogous techniques may be employed for the other file types.

In the case of the stream file type, params 207 includes parameters specifying either a character in the stream file to be used as a terminator or a number of characters. In the first case, GF 119 for the stream file will read until the terminator is reached and process that logical record to produce GF 121. In the second case, GF 119 for the stream file will read the specified number of characters. In both cases, the processing of the logical records will involve little more than the substitution of displayable character codes for non-displayable character codes. An example of such a substitution is the replacement of tab characters by the number of blank characters required to gain the effect of the tab character.

In the case of the record file type, GF 119 for the record file type reads each physical record, removes any record delimiters, converts the contents of the physical record into displayable characters and produces a GF 121 therefrom. For example, if the record is a sequence of ASCII characters delimited by a carriage return and a new line, GF 119 will remove the carriage return and new line and convert the sequence to displayable characters. If the record file is indexed, params 207 permits the user to specify a range of records, and only the records in that range will be converted to GFs 121.

In the case of the document file type GF 119 for the document file type treats a single line of the document as it is printed or displayed as a logical record. Proceeding in the order of the lines in the document, it reads characters from the document until it has one line assembled, converts any non-displayable characters to displayable characters, and outputs the displayable characters to a GF 121. Params 207 for document GFs 119 include parameters specifying the range of pages and lines to be translated.

Figure 10:
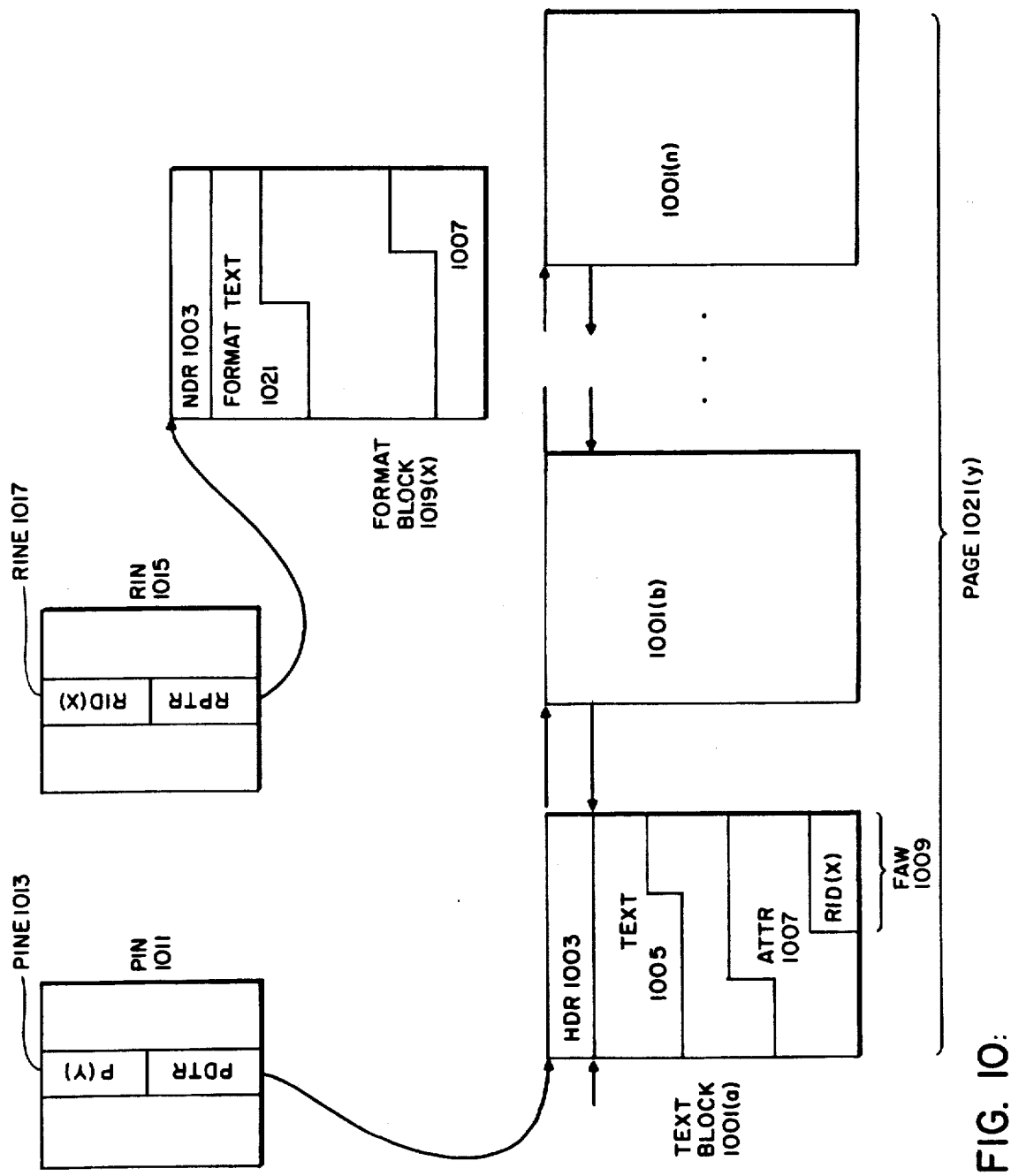
FIG. 10 is a diagram of a WP+ document.
Figure 11:
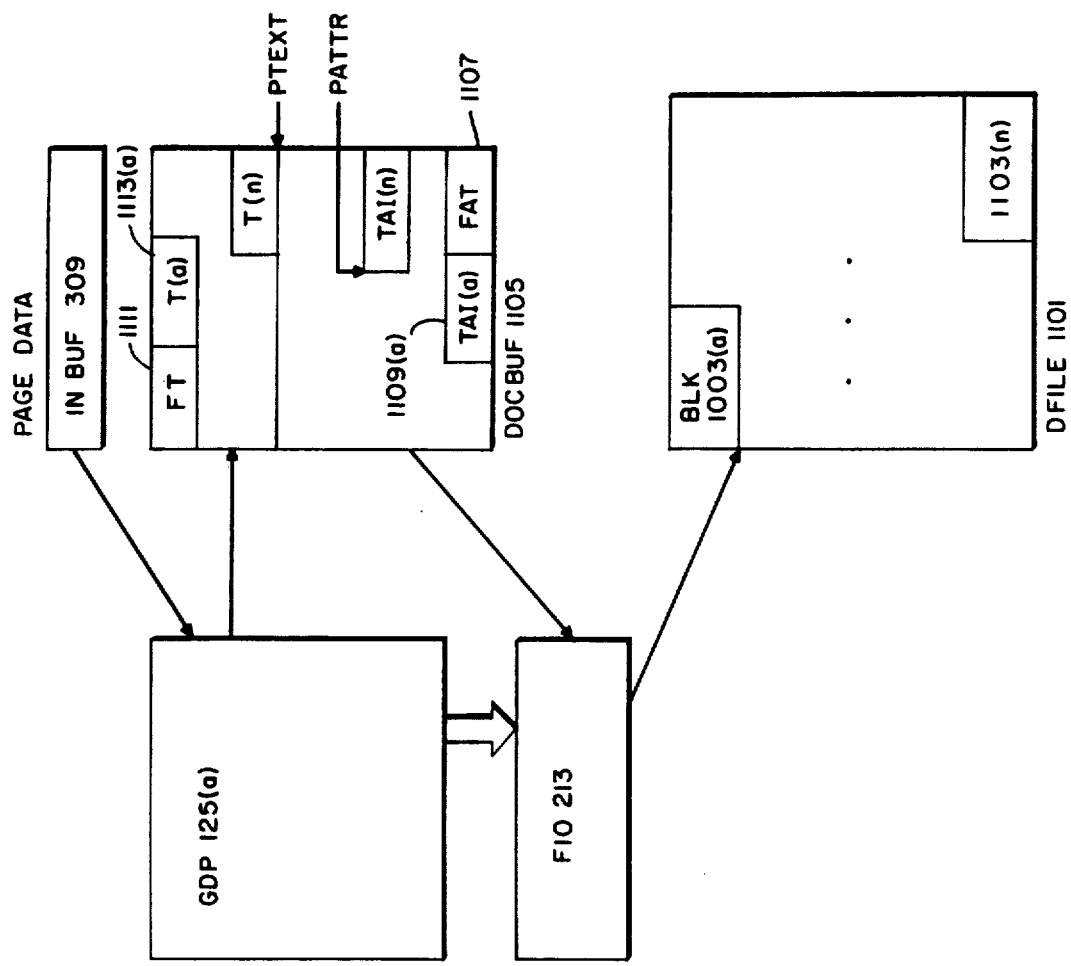
FIG. 11 is a block diagram of GDP 125(a) in a preferred embodiment.
Figure 12:
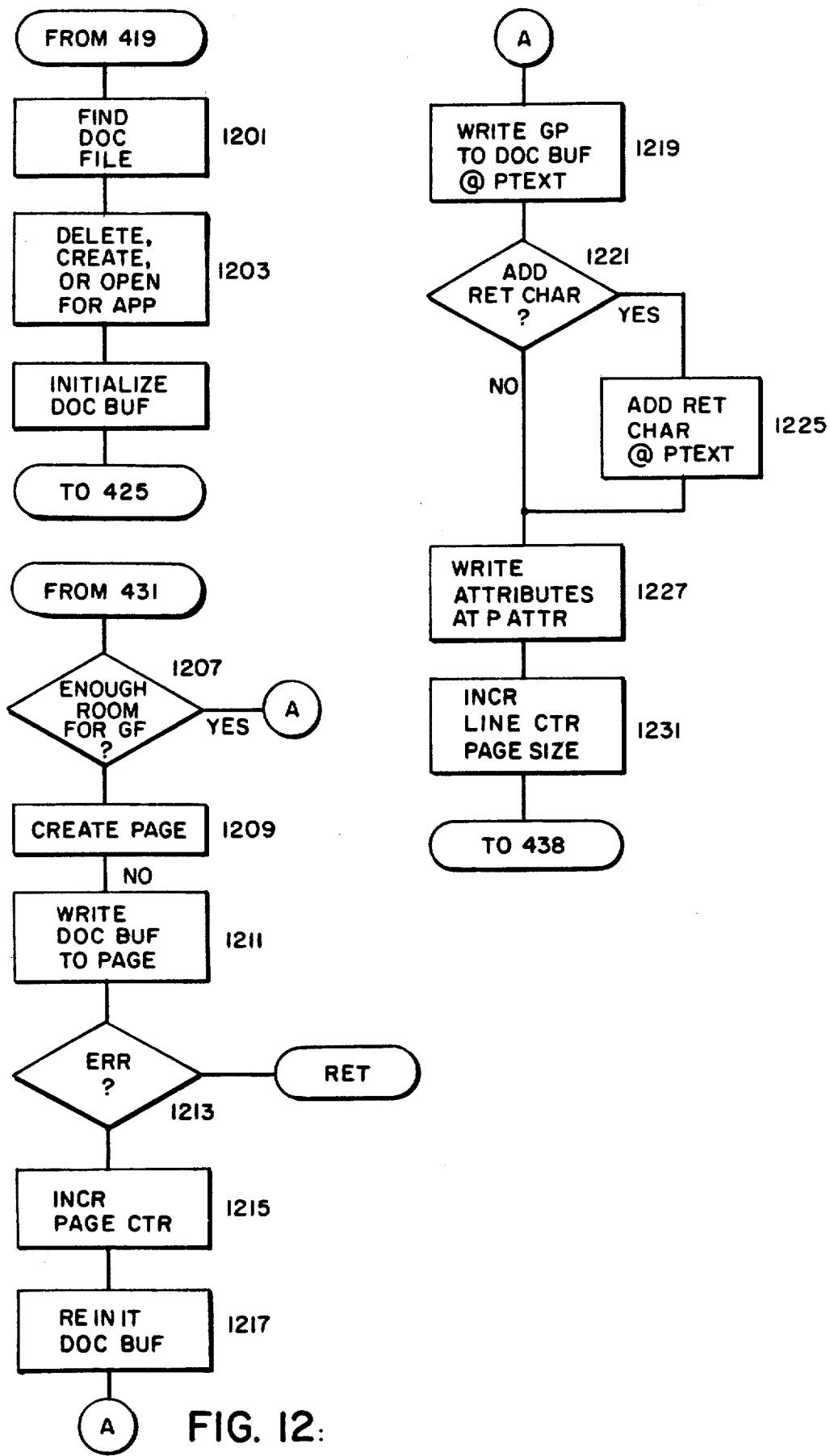
FIG. 12 is a flow chart of the operation of GDP 125(a)

8. Preferred Embodiment of GDP 125(a): FIGS. 10–12

As with SGP 119, a single exemplary GDP 125, referred to hereinafter as GDP 125(a) will be described in detail. GDP 125(a) consists of portions of EX 205(a) which produce a page in a WP+ document from GFs 121 produced by a SGP 119. One skilled in the art may easily apply the principles and techniques disclosed herein to produce GDPs 125 for other types of destination files FD 115.

9. Description of WP+ Document files: FIG. 10

The structure and operation of GDP 125(a) is dependent on the structure of a WP+ document file. Consequently, the discussion of GDP 125(a) will begin with a discussion of the relevant portions of a WP+ document file as shown in FIG. 10. As previously pointed out, document files consist of a plurality of blocks which represent the text of a document and formatting information. The blocks are organized into a document by means of indexes contained in other blocks.

FIG. 10 shows the blocks required to define a typical document page 1021(y). Four kinds of blocks are involved: text blocks 1001(a) . . . (n), which contain the document text for page 1021(y) and attributes of the text, a format block 1019(x), which contains format information for page 1021(y), a page index block (PIN) 1011, which permits location of the first text block 1001(a) in page 1021(y), and a reference index (RIN) 1015, which permits location of format block 1019(x).

Each text block 1001 contains HDR 1003, TEXT 1005, and attributes (ATTR) 1007. HDR 1003 contains among other things pointers linking text block 1001 to the text blocks 1001 containing the preceding and following text of the document. TEXT 1005 contains the character codes for the actual text of the document together with attribute characters indicating the position at which attributes apply. ATTR 1007 contains descriptions of the attributes corresponding to the attribute characters in TEXT 1005. The descriptions are arranged in reverse order of that in which the attribute characters appear, i.e; the first description is at the end of ATTR 1007. Each text block 1001 always includes as its first attribute description a format attribute word (FAW) 1009, which contains among other things a reference identifier (RID) identifying format block 1019 containing the format information for the page 1021 to which text block 1001 belongs. Here, RID(x) specifies format block 1019(x).

Format block 1019 has the same parts as text block 1001, but TEXT 1005 contains a representation of a format for a page. PIN 1011 contains page index entries (PINE) 1013 arranged in order of page number. Each PINE 1013 contains a page number P(#) and a page pointer (PPTR) to the first text block 1001 of the page. Here, the page number is P(y). RIN 1015 contains reference index entries (RINE) 1017 arranged in order of RID. Each RINE 1017 contains a RID, here RID(x), and a reference pointer (RPTR) to the block corresponding to the reference, in this case, format block 1019(x). When a page of a document is displayed or printed, these components are employed as follows: the program which displays or prints the document uses the page number to locate the proper PINE 1013, uses the PPTR to locate the first text block 1001(a) in the page, gets RID(X) from FAW 1009 in text block 1001(a). uses RID(x) to locate the proper RINE 1017, uses the RPTR to locate format block 1019(x), and then outputs text blocks 1001(a) . . . (n) in the page using the format described in format block 1019(x). Seen as records, text blocks 1001 are the physical records in WP+ document files, while page 1021 is a logical record.

10. Structure of a Preferred Embodiment of GDP 125(a): FIG. 11

FIG. 11 shows the components of GDP 125(a) in a preferred embodiment. GDP 125(a) operates generally by producing a section of document text from each GF 121 it receives, accumulating the sections in a document page buffer until it has an entire page full, and then outputting the contents of the document page buffer to the document file.

As previously mentioned, GDP 125(a) is made up of portions of EX 205(a). In producing document pages, it uses INBUF 309, which contains GF 121 produced by whatever SGP 119 is operating, DOCBUF 1105, which accumulates a page worth of text and attribute information, and DFILE 1101, the document file which will receive the page from DOCBUF 1105. In a preferred embodiment, FIO 213 includes special routine for creating a writing document pages. DFILE 1101, as previously explained, is made up of blocks (BLK) 1103. Included in the blocks are text blocks 1001, format blocks 1019 and other reference blocks, PINs 1011, RINs 1015, and other index blocks and further blocks containing information used to manipulate DFILE 1101. DOCBUF 1105 has a structure required by the FIO 213 routine which writes pages. The first item in DOCBUF 1105 is format text (FT) 1111, which is the text to be incorporated into format block 1019 for the page. The following items are sections of text, T 113(a) . . . (n) in the order in which they will appear on the page. The location of the last T 113 presently in DOCBUF 1105 is specified by a pointer called PTEXT, shown in the control data part of FIG. 11 as PTEXT 1115. The last item in DOCBUF 1105 is format attribute information (FAI) 1107, which is part of the information FIO 213 require to make FAW 1009 for the text blocks 1001 making up page 1021. Moving up from FAI 1107, there may be a succession of text attribute information (TAI) 1109(a) . . . (z), containing information required for attribute descriptions. The location of the last TAI 1109 currently in DOCBUF 1105 is indicated by the pointer PATTR, shown under the reference number 1119 in the control data. Other items in the control data include LINECTR 1121, which keeps track of how many lines have been output to the page. PGCTR 1123, which keeps track of how many pages have been output to DFILE 1101, and PGSIZE 1125, which keeps track of how many bytes are currently in DOCBUF 1105. Additionally, five parameters of params 207 control operation of GDP 125(a):

retchar: append a return character to GF 121 when producing RD 117;
nlines: the number of lines per page in the WP+ document,
tabs: the number of columns between tabs on the format line;
flen: the length of the format line;
scratch: a flag indicating whether an existing output file should be deleted and a new one created.

11. Operation of GDP 125(a): FIG. 12

FIG. 12 is a flow chart of GDP 125(a). The flow chart is divided into two sections: one indicating the operations performed by GDP 125(a) in block 421 of FIG. 4 and another indicating the operations performed in blocks 433 through 437 of FIG. 4. Beginning with the first section, blocks 1201 through 1203 initialize DFILE 1101. First, GDP 125(a) employs FIO 213 to locate DFILE 1101 using the file name specified by the outfile parameter of params 207. If there is no such file, FIO 213 creates it; if there is one and scratch is specified, FIO 213 deletes the old file and creates a new one with the same name; otherwise, FIO 213 opens the old file so that the new material can be appended to it. Finally, GDP 125(a) initializes DOCBUF 1105. This involves writing FT 1111 and FAI 1107 and setting PTEXT 1115 to indicate the location immediately following FT 1111 and PATTR to indicate the location immediately preceding FAI 1107. The information used in writing FT 1111 comes from the tabs and flen parameters of params 207.

Continuing with the second section of FIG. 12, this section is contained in read-write loop 423 of FIG. 4 and shows how each GF 121 corresponding to a SYLK row is received in INBUF 309 and written to DOCBUF 1105 until DOCBUF 1105 is full, at which time a new page 1021 is created in DFILE 1101 and the contents of DOCBUF 1105 are output to the new page 1021. The first step, block 1207, is to test whether there is enough room for the new GF 121. If DOCBUF 1105 is full, as indicated by PGSIZE 1125, or if LINECTR 1121 indicates that it contains the number of lines permitted by the nlines parameter from params 207, a new page is created, as shown in blocks 1209 through 1217. First, FIO 213 is called to create a new page 1021. In so doing, FIO 1213 sets up PINE 1013 for new page 1021. Next, an attribute character marking a page break is appended to the last T 1113 and a page break attribute descriptor added ahead of the last TAI 1109. FIO 213 is again called to output DOCBUF 1105 to new page 1021. The routine which performs the page output constructs format block 1019 for the page from the information in FT 111, makes RINE 1017 for format block 1019, and then creates text blocks 1001 using T 113 and TAI 1109. Each new text block 1001 will contain a FAW 1009 with the RID for format block 1019. If there is an error in the output, EX 205(a) returns; otherwise, PAGECTR is incremented and DOCBUF 1105 is reinitialized as described in the discussion of block 1205.

If DOCBUF 1105 is not full, GF 121, contained in INBUF 309, is written to the location in DOCBUF 1105 specified by PTEXT and PTEXT is incremented to point beyond the new T 1113 (block 1219). If retchar in params 207 specifies that a return character is to be added, that character is output to DOCBUF 1105 at the location specified by PTEXT and PTEXT is again incremented. Thereupon, filler TAIs 1109 are written to DOCBUF 1105, with PATTR 1119 being updated each time (block 1227). PGSIZE 1125 is incremented during the writing of T 1113 and TAIs 1109 to keep track of the amount of space remaining in DOCBUF 1105, and if a return character was added, LINECTR 1121 is incremented.

As may be seen by reviewing the description of operation of SGP 119(a) and GDP 125(a), if a user of the document exchange apparatus specifies a tab character as the character to be inserted into GF 121 and that a return character be added following each GF 121, each row from SYLKF 513 will appear in the document prepared from DFILE 1101 in substantially the same form which it had in the spread sheet.

As will be clear to one skilled in the art, the methods and techniques of GDP 125(a) may be used to produce any kind of document file from a succession of GFs 121. Moreover, analogous techniques may be employed for the other file types.

In the case of the stream file type, the succession of GFs 121 is simply output to the stream file, with the addition of the return character if so specified in params 207. In the case of the record file type, any additional codes required for the record format are added to the GF 121 and it is output as a physical record to the record file. Params 207 for EX 205 performing exchanges to record file types permit specification of record size, record type, and in the case of index files, the range of index values. For example, if the record is a sequence of ASCII characters followed by a record delimiter such as a carriage return followed by a line feed, the relevant GDP 125 will form the record by adding the delimiter to the GF 121.

In the case of the record and field file type, the GDP 125 sets up ID, B, and F records using values from params 207 and then produces a row of C records from each GF 121. If GF 121 includes a field identifier code preceding the contents of each cell in the row represented by GF 121, the user specifies that code as a parameter in params 207 and GDP 125 for the file type constructs a new C record for each GF 121 so identified, determining the Y and X values for the record from the number of the row represented by the GF 121 and the position of the field in the record. If GF 121 does not include a character code preceding the contents of each cell, the user must provide parameters specifying the number of columns per row, the width of each column, and the starting position of each column represented in the GF 121. The user may optionally provide an array specifying the data type of the data in each column contained in the GF 121. Arrays constructed using these parameters are then employed by GDP 125 to assign portions of GF 121 to spread sheet cells. As will be described in more detail hereinafter, in a preferred embodiment, the data viewing apparatus may be employed to interactively specify the paramters for the number of columns per row, the width of each column, the starting position of each column, and the type of each column.

Figure 14:
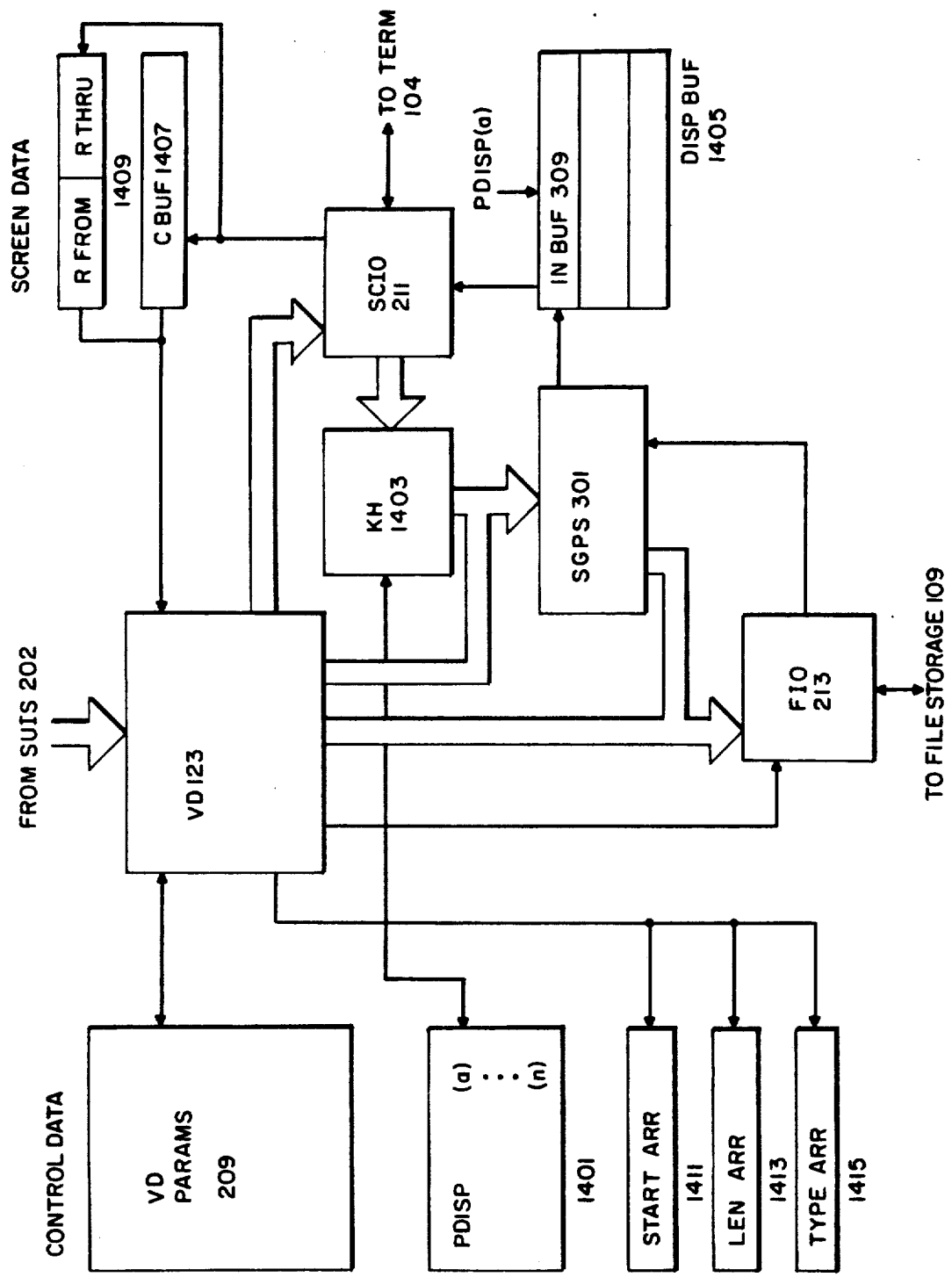
FIG. 14 is a block diagram of a VD 123 in a preferred embodiment.
Figure 15:
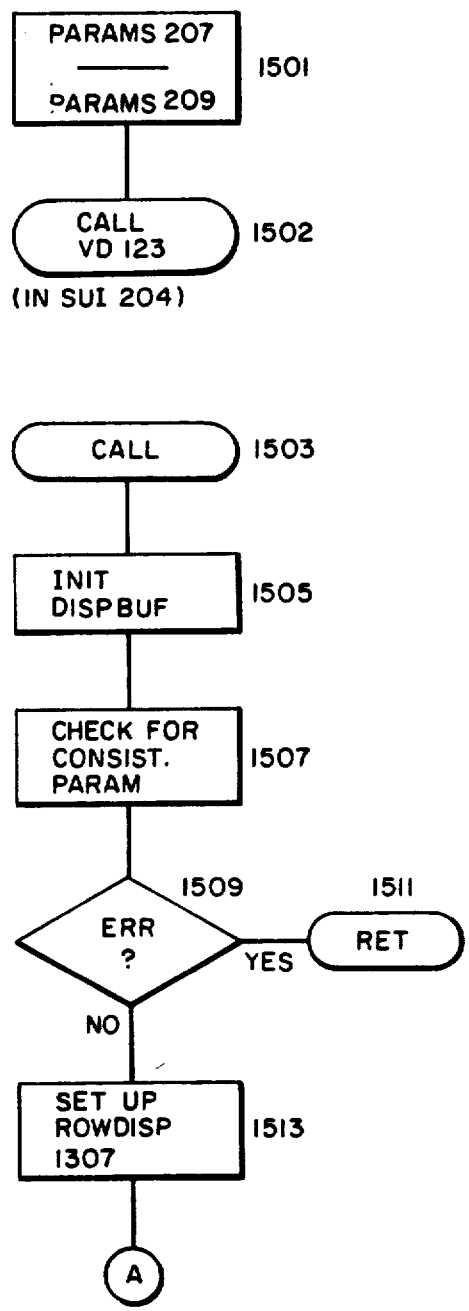
FIG. 15 is a flow chart of the operation of VD 123.
Figure 15:
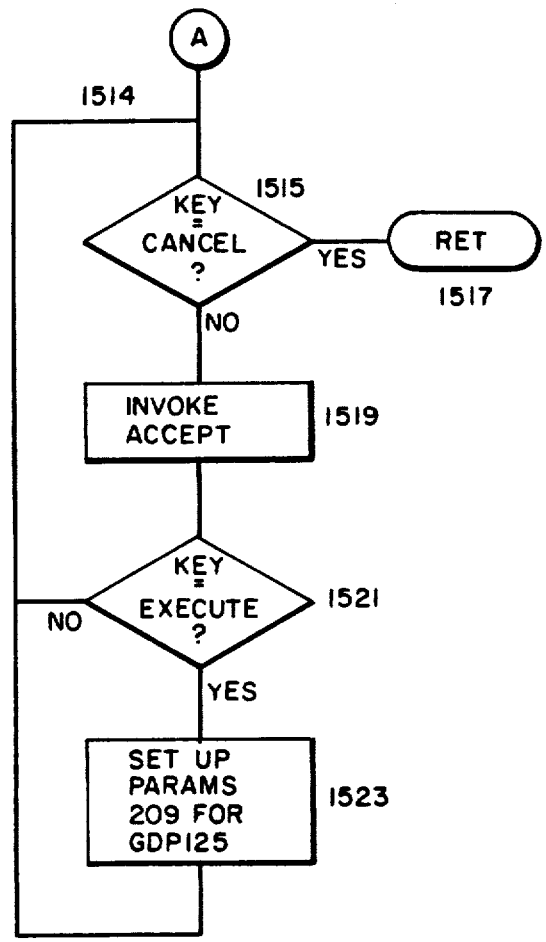

12. Preferred Embodiment of VD 123: FIGS. 13–15

VD 123 is employed in a preferred embodiment to view logical records RS 113 contained in source file FS 111 and to enable the user of the data exchange apparatus to provide information which a GDP 125 can employ in preparing logical records RD 117 for output to FD 115. In a preferred embodiment, VD 123 is specified as an option on certain screens produces by SUIS 202 and is invoked when a user of the data exchange apparatus selects it as an option and hits an EXECUTE key on his keyboard (INPUT 106). In other embodiments, VD 123 may be invoked in other fashions.

13 VD 123 Screen: FIG. 14

When a user of the data exchange apparatus specifies VD 123, the screen illustrated in FIG. 13 appears on DISP 105. That screen has the following parts:

From row specifier 1301 and through row specifier 1303, which permit the user to specify a range of rows to be output to FD 115.

Column Data 1305, which permits the user to specify the number of fields in a row, the width of each field, and the type of data in each field.

Row display 1307, which displays four logical records RS 113 from FS 111. Each logical record RS 113 occupies 1 row 1309.

Function keys 1311. The numbers specify certain function keys on INPUT 106 which can be used to see other portions of the displayed rows or other rows and to see a hexadecimal representation of the characters making up the rows.

The user interacts with the VD 123 screen as follows: if he wishes to see a hex display of the first row 1309 displayed in row display 1307, he hits function key 3; if he wishes to see the next four RSs 113, he hits function key 5; if he wishes to scroll up or down 1 record, he hits function key 6 or 7; if he wishes to move to the left or right end of the displayed rows 1309, he hits function key 9 or 10; if he wishes to move left or right by 64 characters, he hits function key 15 or 16. The utility of those function keys which permit the user to see different rows 1309 and different portions of those rows 1309 displayed in row display 1307 is obvious; the hex display permits the user to see whether the fields of a row are preceded by a field identifier code and if they are, to determine the value of the code. He may then return to the screen for SUI 204 from which VD 123 is invoked and specify that code as the value of a parameter in params 207 which specifies the field identifier code.

When the user is ready to output to FD 111, he fills in locations 1301 and 1303 to specify the range of desired rows and may additionally edit column data 1305 to specify how rows 1309 are to be divided into fields and what type each field is to have. A field is defined in column data by an uninterrupted sequence of a single character. If the character is a letter, the field is taken to have a character type; if the character is a number and the field contains numeric values, the field is taken to have a numeric type; otherwise, it is treated as having a character type. For example, aaaaaaaabbbbbb11111111112222222

Smith John 034682571 032258

The aaa and bbb sequences specify Smith and John as character fields having lengths equal to the length of the sequences and the 111 and 222 sequences specify the digits a numbers having the number of digits in the sequence. A GDP 125 can use the fields so specified in producing records RD 117 for output to FD 115. For example, if FD 115 is a SYLK file, each field would become a K value in a C record and the record's X and Y values would be determined from the position of the field in row 1309 and the number of the row currently being produced in the SYLK file.

14. Structure of a Preferred Embodiment of VD 123: FIG. 14

FIG. 5 is a block diagram of programs and data structures making up a preferred embodiment of VD 123. The programs are VD 123. FIO 213, which performs file I/O, SCIO 211, which performs I/O for TERM 104, SGPS 301, which are programs for converting logical records RS 113 to GFs 121, and KH 1403, which is a user-defined keystroke handle used by SCIO 211 to interpret keystrokes received from a screen.

The data structures fall into two classes: screen data, which is received from or output to the VD 123 screen, and control data, which controls the operation of VD 123. Beginning with the screen data, DISPBUF 1405 contains the four rows currently being displayed in row display 1307. DISPBUF 1405 is accessible to both SCIO 211 and FIO 213, and its contents can consequently be either displayed on DISP 105 or output to FD 115 via FIO 213. The topmost row of DISPBUF 1405 is INBUF 309, the buffer which receives the GF 121 produced by an SGP 119. The columns of DISPBUF 1405 currently being displayed in the screen are determined by a PDISP pointer 1401 for each of the rows in DISPBUF 1405. CBUF 1407 contains any input by the user to column data 1305. RFROM and RTHRU 1409 contain user input from screen fields 1301 and 1303.

Control data in VD 123 consists of PDISP pointers 1401 for determining which columns of DISPBUF 1405 are being displayed, three arrays of field location and type information, STARTARR 1411, LENARR 1413, and TYPEARR 1415, and VD Params 209. STARTARR 1411 contains the location of the start of each field in row 1309; LENARR 1413 contains the length of each field in row 1309; TYPEARR 1415, finally, contains the numeric or character type of each field in row 1309. VD params 209 generally contain the same data as EX params 207 and additionally contains the following:

colsw: flag indicating that fields in GF 121 are preceded by a specified character code;
colid: the character code which precedes a field;
mrsize: the maximum number of characters in a record;
numcols: the maximum number of fields in a row;
start: pointer to STARTARR 1411;
length: pointer to LENARR 1413;
type: pointer to TYPEARR 1415.

As may be seen from the broad arrows indicating calls and the single-line arrows indicating data flow, VD 123 in a preferred embodiment operates broadly as follows: VD 123 is invoked by an SUI 202 which, before invocation, sets the relevant fields of VD params 209 from the current values of EX params 207. VD 123 opens FS 111 and then invokes the proper SGP 119 to obtain GFs 121 for the VD 123 screen. Next, it invokes SCIO 211 to display the screen of FIG. 13 and obtain keystroke input from the screen. SCIO 211 in turn invokes KH 1403, which handles the keystroke input, setting values in RFROM and RTHRU 1409 and CBUF 1407, displaying a hexadecimal representation of the first row 1309 in row display 1307, and moving up or down in FS 111 and sideways in row display 1307 as specified by the keystroke inputs. If additional RSs 113 are required for row display 1307, KH 1403 invokes the proper SGP 119 to obtain them and outputs them to DISPBUF 1405. When the user hits the EXECUTE key, KH 1403 returns to SCIO 211, which returns to VD 123. VD 123 then reads CBUF 1407, sets STARTARR 1411, LENARR 1413, and TYPEARR 1415 therefrom, sets rfrom and rthru parameters in params 209, and returns. The values thus set are then available to whatever GDP 125 the user is employing in his data exchange.

15. Detailed Operation of VD 123: FIG. 15

FIG. 15 is a flowchart showing detailed operation of VD 123. The first part of operation, shown as blocks 1501 and 1502, takes place in SUI 204, where SUI 204 assigns parameter values from params 207 to params 209 before it calls VD 123. Upon being called, VD 123 initiates DISPBUF, checks that the parameters in params 209 are consistent, and returns if there is an error (blocks 1503-1511). Next, VD 123 sets up row display 1307 by invoking FIO 213 to open FS 111 and invoking the proper SGP 119 to convert the first four logical records RS 113 in the file into GFs 121, which VD 123 places in INBUF 309. Next, key response loop 1514 is executed until the user hits the CANCEL key, at which point VD 123 returns (blocks 1515, 1517). The first step in key response loop 1514 is to invoke the SCIO ACCEPT function. The parameters for that function specify DISPBUF 1405 as a location to be displayed and KH 1403 as the key handler routine. ACCEPT returns a single keystroke whose value is determined by KH 1403.

ACCEPT invokes KH 1403, which responds to user keystrokes by modifying row display 1307 and setting CBUF 1407 and RFROM and RTHRU 1409 until the user hits EXECUTE or CANCEL (block 1519). If the user hits CANCEL, that keystroke is returned and loop 1514 is terminated; if the user hits EXECUTE, that keystroke is returned and VD 123 reads CBUF 1407 and sets STARTARR 1411, LENARR 1413, and TYPEARR 1415 from the contents thereof. As previously explained, the starting locations stored in STARTARR 1411 are marked in CBUF 1407 by a change in the character used in a sequence, the length is determined by the number of characters in a sequence, and the type by whether, the character is a letter or a number. VD 123 further sets the RFROM and RTHRU parameters in params 209 from RFROM and RTHRU 1409 (block 1523).

16. Conclusion

The foregoing Specification has shown how certain problems of data exchange between files of different types may be overcome by means of data exchange apparatus which reads a logical record from a source file, produces a generic form containing only displayable characters therefrom, and produces a logical record for a destination file from the generic form. The Specification further discloses a prefered embodiment of the data exchange apparatus and shown how it may be employed to exchange data between a SYLK source file and a WP+ document destination file.

Other important aspects of the data exchange apparatus disclose herein in a preferred embodiment include permitting the user to specify a code which will precede each field of a row and which will appear in empty fields and the data viewing apparatus. The data viewing apparatus permits the user of the data exchange apparatus both to view the contents of the source file as a sequence of rows and also permits the user to interactively define the manner in which a row is to be divided into fields and the types of the fields.

While the preferred embodiment described herein was implemented in a Professional Computer manufactured by Wang Laboratories, Inc; the data exchange apparatus may be implemented in any computer system. Further, as will be clear to one skilled in the art, many implementations other than the preferred embodiment disclosed herein are possible. In particular, user-defined character codes and the data viewing apparatus may be employed in other data exchange apparatus which does not use the generic form employed by the present apparatus. Thus, the preferred embodiment disclosed herein is to be considered in all respects illustrative and not restrictive, the scope of the invention being indicated by the appended claims rather than the foregoing description, and all changes which come within the meaning and range of equivalency of the claims are intended to be embraced therein.

What is claimed is:

1. A digital computer system including a data display apparatus and having access to files for storing items of data, the files belonging to a plurality of file types wherein the file types include a stream file type, a record file type, said digital computer system comprising:
   a data viewing apparatus for viewing one or more of the items of data in a file having any one of the plurality of file types, the data viewing apparatus comprising:
   (1) generic form production means for reading a logical record containing an item of data from a file and using the contents of the logical record to produce a generic form of the logical record which is non-specific to any of the file types and which represents the contents of the logical record as an arrangement of codes representing displayable characters and
   (2) display production means for receiving the generic form of the logical record and producing a display thereof on the data display apparatus; and
   a destination file production means for receiving the generic form of the logical record to produce a destination file logical record from contents of the generic form, said destination file logical record having a format proper for the file type of a destination file.

2. The digital computer system of claim 1 wherein:
   the display production means displays the generic form as a row.

3. The digital computer system of claim 1 wherein:
   the generic form production means produces a plurality of generic forms wherein each one of the plurality of generic forms corresponds to one of a sequence of logical records read from the source file and
   the display production means produces a display of the generic forms in an order corresponding to an order of the logical records in the sequence.

4. The digital computer system of claim 1 wherein:
   the digital computer system further includes a data input apparatus; and
   the display production means receives a first display operation specifier from the data input apparatus and produces the display of a first generic form as specified by the first display operation specifier.

5. The digital computer system of claim 4 wherein:

a second display operation specifier specifies a second logical record different from a record corresponding to the first generic form currently being displayed; and the generic form production means responds thereto by reading the second logical record from the file and using contents of the second logical record to produce a second generic form.

6. The digital computer system of claim 4 wherein:

the display operation specifier specifies that a portion of the generic form be displayed; and the display production means responds thereto by producing a display of the portion.

7. The digital computer system of claim 4 wherein:

the display operation specifier specifies that the generic form be displayed as a sequence of hexadecimal values; and the display production means responds thereto by displaying the generic form as the corresponding sequence of hexadecimal values.

8. In a digital computer system including a data display apparatus and a data exchange apparatus for exchanging data between a source file and a destination file, each of these files belonging to one of a plurality of file types wherein the file types include a stream file type, a record file type, a record and field file type and a document file type, a method for viewing one or more of the items of data in the source file to be exchanged with the destination file comprising:

selecting a file containing an item of data to be viewed;

reading a logical record which contains the item of data to be viewed from the selected file;

using the contents of the logical record to produce a generic form of the logical record which is non-specific to any of the file types which represents the contents of the logical record as an arrangement of codes representing displayable characters; and producing a display of the generic form on the data display apparatus.

9. In a digital computer system having access to files belonging to a plurality of file types, a display apparatus for receiving a control input from a user of the digital computer system, a data exchange apparatus for exchanging data between a source file having a first file type and a destination file having a second file type different from the first file type, comprising:

(1) generic form production means for reading a source file logical record from the source file and producing a generic form representation of contents of the logical record wherein the contents are represented as an arrangement of codes representing displayable characters that are non-specific to the first file type or the second file type;

(2) destination record production means for receiving the generic form representation, using the representation therein to produce a destination file logical record, and writing the destination file logical record to the destination file;

(3) data viewing means for receiving the generic form representation and displaying the generic form representation on the display apparatus; and (4) data exchange control means for receiving the control input from the input apparatus, for operating the generic form production means and the destination record production means to exchange contents of a first source file logical record between the source file and the destination file and for operating the generic form production means and the data viewing means to view contents of a second given source file logical record as determined by the control input.

10. A digital computer system having access to files for storing items of data, the files each having a file type selected from a plurality of file types wherein the file types include a stream file type, a record file type, a record and field file type and a document file type, wherein each file type identifies the format of items of data stored therein, said digital computer system including a display apparatus for displaying data and a data exchange apparatus for exchanging one or more items of data between a source file having a file type within the plurality of file types and a destination file having a different one of the plurality of file types, the data exchange apparatus comprising:

(1) for each of the file types, a generic form production means for operating when the source file has a corresponding source file type to read a source file logical record containing an item of data from the source file for each item of data to be exchanged and to produce a generic form from the source file logical record, the generic form representing each item of data as an arrangement of codes of displayable characters, said generic form being non-specific to any of the file types; and (2) for each of the file types, destination record production means for operating when the destination file has a corresponding file type to receive the generic form for each item of data to be exchanged, to use the generic form of each item of data to produce a destination file logical record in which each item of data has a proper format for the corresponding file type of the destination file, and to write the destination file logical record to the destination file.

11. The digital computer system of claim 10 wherein:

the source file logical record contains a field of data and the generic form production means includes means for receiving a field identifier code specified by a user and including a field identifier code in the generic form as identification for a representation of the field of data in the source file logical record in the generic form.

12. The digital computer system of claim 10 wherein:

the data exchange apparatus further includes data viewing means for receiving the generic form of the source file logical record from the generic form production means and for displaying the generic form of the source file logical record on the display apparatus.

13. The digital computer system of claim 12 wherein:

the data viewing means further includes interactive means for defining fields of data in source file logical records in the generic form; and the destination record production means responds to such fields defined in the generic form by producing fields of data in destination file logical records corresponding to the defined fields of data in the generic form, said fields of data in the destination file logical records contain representations of data represented in the corresponding fields of the generic form.

14. The digital computer system of claim 10 wherein:
the data exchange apparatus further includes means for specifying operations to be performed during the exchange of data and
the generic form production means and the destination record production means each respond to the means for specifying operations by performing certain of the specified operations.

15. The digital computer system of claim 14 wherein:
the means for specifying operations is interactive.

16. The digital computer system of claim 10 wherein:
the source file has a stream file type;
the source file logical record is a sequence of codes from the source file; and
the generic form production means produces a generic form of the source file logical record which is an arrangement of displayable characters representing the sequence of codes of the source file logical record.

17. The digital computer system of claim 10 wherein:
the source file has a record file type; and
the generic form production means produces a generic form of the source file logical record which is an arrangement of displayable characters representing contents of the source file logical record.

18. The digital computer system of claim 10 wherein:
the source file has a record and field file type and represents a tabular display;
the source file logical record is a representation in the source file of a row of the tabular display; and
the generic form production means produces a generic form of the source file logical record which is an arrangement of displayable characters representing the row.

19. The digital computer system of claim 18 wherein:
the row of the tabular display is subdivided into empty and non-empty cells; and
the generic form production means further receives a user-defined field identifier code which it inserts ahead of the representation of each non-empty cell in the generic form and which it inserts at each location in the generic form corresponding to a location of an empty cell in the row.

20. The digital computer system of claim 10 wherein:
the source file has a document file type;
the logical source file record is a line of the document; and
the generic form production means produces a generic form of the source file logical record which is a representation in displayable characters of the line.

21. The digital computer system of claim 10 wherein:
the destination file has a stream file type;
the destination file logical record is a sequence of codes of types acceptable in the destination file; and
the destination record production means produces a sequence of codes of types acceptable in the destination file that represent the generic form of the source file logical record.

22. The digital computer system of claim 10 wherein:
the destination file has a record file type;
the destination file logical record is a physical record of the destination file; and
the destination record production means produces a physical record of the destination file which contains a representation of the generic form of the source file logical record.

23. The digital computer system of claim 10 wherein:
the destination file has a record and field file type;
the destination file logical record is a representation of a row in the destination file; and
the destination record production means produces a row representation using contents of the generic form of the source file logical record.

24. The digital computer system of claim 23 wherein:
the generic form includes a field identifier character defined by a user for identifying empty and non-empty fields; and
the destination record production means receives a field identifier character specification specifying the field identifier character and responds thereto by producing a row representation containing empty and non-empty fields as specified by the field identifier character.

25. The digital computer system of claim 10 wherein:
the destination file has a document file type;
the destination file logical record is a representation of a page containing a line in the destination file; and
the destination record production means produces a page wherein the line is a representation of contents of the generic form of the source file logical record.

26. The digital computer system of claim 25 wherein:
the destination record production means is responsive to a user specification that the generic form of the source file logical record corresponds to the line and appends a code specifying a new line to the representation of the contents of the generic form of the source file logical record.

27. In a digital computer system having access to files for storing items of data, the files belonging to a plurality of file types wherein the file types include a stream file type, a record file type, a record and field file type and a document file type, said file types identifying a format of the items of data stored therein,
a method of exchanging one or more of the items of data between any source file having one of the plurality of file types of the file types and any destination file having one of the plurality of file types which is different from the source file type, the method comprising the steps of:
from a plurality of generic form production means, each corresponding to one of the plurality of file types, selecting a generic form production means corresponding to the source file's file type and from a plurality of destination record production means, each corresponding to one of the plurality of file types, selecting a destination record production means corresponding to the destination file's file type; and
for each one of the items of data to be exchanged, performing the steps of
employing the selected generic form production means to perform the steps of
reading a source file logical record containing the item of data from the source file and
producing a generic form from the logical record, the generic form representing the item of data as an arrangment of codes representing displayable characters that are non-specific to any of the file types and
employing the selected destination record production means to perform the steps of producing from the generic form a destination file logical record in which the item of data has a proper format for the type of the destination file and writing the destination file logical record to the destination file.

28. The method of claim 27 wherein:

the source file has a stream file type and the source file logical record is a specified sequence of codes from the source file; and the step of producing the generic form is performed by representing the specified sequence of codes by means of a sequence of distinct additional codes representing corresponding displayable characters.

29. The method of claim 27 wherein:

the source file has a record file type; and the step of producing the generic form is performed by representing contents of the source file logical record by means of a sequence of distinct additional codes representing corresponding displayable characters.

30. The method of claim 27 wherein:

the source file has a record and field file type and represents a tabular display and the source file logical record is a representation in the source file of a row of the tabular display; and the step of producing the generic form is performed by representing the contents of the row by means of a sequence of distinct additional codes representing corresponding displayable characters.

31. The method of claim 27 wherein:

the source file has a document file type and the source file logical record is a line of the document; and the step of producing the generic form is performed by representing contents of the line by means of a sequence of distinct additional codes representing corresponding displayable characters.

32. The method of claim 27 wherein:

the destination file has a stream file type and the destination file logical record is a sequence of codes that are acceptable to the destination file given its stream file type; and the step of producing the destination file logical record is performed by producing a sequence of codes representing the contents of the generic form.

33. The method of claim 27 wherein:

the destination file has a record file type; and the step of producing the destination file logical record is performed by producing a physical record of the destination file which contains a representation of the generic form.

34. The method of claim 27 wherein:

the destination file has a record and field file type and represents a tabular display and the destination file logical record is the representation in the source file of a row of the tabular display; and the step of producing the destination file logical record is performed by producing a row representation which contains a representation of the generic form.

35. The method of claim 34 wherein:

the destination file has a document file type and the destination file logical record is a representation of a page containing a line; and the step of producing the destination file logical record is performed by using contents of the generic form to produce a line.

36. In a digital computer system having access to files for storing items of data, the files each having a file type of a plurality of file types, said file types including a stream file type, a record file type, a record and field file type and a document file type and identifying a format of the items of data stored therein, a data exchange apparatus for exchanging one or more of the items of data between a source file having a first file type and a destination file having a second file type that is different from the first file type, comprising:

(1) operation specification means for specifying operations to be performed during exchange of items of data; and (2) record exchange means operating as specified by the operation specification means for performing an exchange operation for each item of data, the exchange operation including reading a source file logical record from the source file, using contents of the source file logical record to produce a generic form in which the contents of the source file logical record are represented as an arrangement of codes representing displayable characters such that the arrangement is non-specific to any of the file types, using the contents of the generic form to produce a destination file logical record in which each item of data has a format proper for a file of a type of the destination file, and writing the destination file logical record to the destination file.

37. The data exchange apparatus of claim 36 wherein:

the operation specification means operates interactively to obtain specifications of operations from a user of the data exchange apparatus.

38. The data exchange apparatus of claim 37 wherein:

the operation specification means includes an interactive viewing means for viewing a display of the generic form and for specifying an operation in terms of the display.

39. The data exchange apparatus of claim 36 wherein:

the operation specification means specifies a file type of the source file and a file type of the destination file; and the record exchange means reads the source file logical record and produces the destination logical record.

40. The data exchange apparatus of claim 36 wherein:

the data exchange involves a plurality of source file logical records; and the record exchange means performs an operation specified by the operation specification means each time the record exchange means performs the exchange operation for one of the plurality of source file logical records.

41. The data exchange apparatus of claim 36 wherein:

the source file logical record includes at least one field;

the operation specification means specifies an input field identification operation and a field identifier code; and the record exchange means performs the input field identification operation by employing the field identifier code in the generic form to identify a representation therein corresponding to the field of the source file logical record.

42. The data exchange apparatus of claim 41 wherein:

the field in the source file logical record is empty; and the record exchange means further performs the input field identification operation by employing the field identifier code to identify a location in the generic form corresponding to the empty field in the source file logical record.

43. The data exchange apparatus of claim 41 wherein:
the operation specification means operates interactively to obtain a field identifier code from a user of the data exchange apparatus.

44. The data exchange apparatus of claim 36 wherein:
the destination file logical record contains at least one field;
the operation specification means specifies an output field identification operation; and
the record exchange means performs the output field identification operation by identifying a representation of the field in the generic form and using the representation of the field to produce the field in the destination file logical record.

45. The data exchange apparatus of claim 44 wherein:
the operation specification means specifies the output field identification operation by specifying a field identifier code in the intermediate representation; and
the record exchange means identifies the representation of the field by means of the field identifier code.

46. The data exchange apparatus of claim 45 wherein:
the operation specification means includes a viewing means for viewing a display of the generic form to determine the field identifier code.

47. The data exchange apparatus of claim 44 wherein:
the operation specification means specifies the output field identification operation by specifying a starting position and a length of the representation of the field in the generic form; and
the record exchange means identifies the representation of the field by means of the starting position and the length.

48. The data exchange apparatus of claim 47 wherein:
the operation specification means includes an interactive viewing means for viewing a display of the generic form and for specifying the starting position and length of the field in the generic form.

49. The data exchange apparatus of claim 47 wherein:
the operation specification means further specifies a type of the representation of the field in the generic form; and
the record exchange means represents the representation of the field in a manner consistent with a specified field type in the destination file.

50. The data exchange apparatus of claim 49 wherein:
the operation specification means includes an interactive viewing means for viewing a display of the generic form and specifying a field type of the field in the generic form.

51. The data exchange apparatus of claim 36 wherein:
the operation specification means specifies that the generic form be stored in the destination file logical record so that it is followed by a character code representing a new line; and
the record exchange means responds thereto by placing the character code representing a new line after the generic form in the destination file logical record.

52. The data exchange apparatus of claim 36 wherein:
the source file has a stream type;
the operation specification means specifies the source file logical record; and
the record exchange means responds thereto by reading the specified logical record from the source file.

53. The data exchange apparatus of claim 52 wherein:
the operation specification means specifies the source file logical record by specifying a number of character codes; and
the record exchange means responds thereto by reading a sequence of codes containing the specified number of codes from the source file as the specified logical record.

54. The data exchange apparatus of claim 52 wherein:
the operation specification means specifies the source file logical record by specifying a logical record terminator code; and
the record exchange means responds thereto by reading a sequence of codes from the source file until the logical record terminator code is encountered and then by employing the read sequence as the logical record.

55. The data exchange apparatus of claim 36 wherein:
the source file has an indexed record type wherein logical source file records are specified by index values;
the operation specification means specifies a range of the index values; and the record means responds thereto by reading the source file logical record only if the source file logical record's index value is within the specified range of index values.

56. The data exchange apparatus of claim 36 wherein:
the destination file has an indexed record type wherein logical records are specified by index values;
the operation specification means specifies a range of the index values; and
the record exchange means responds thereto by producing the destination file logical record only if the destination file logical record's index value is within the specified range of index values.

57. The data exchange apparatus of claim 36 wherein:
the source file has a document type wherein the source file logical record is a page which has a page number;
the operation specification means specifies a range of page numbers; and
the record exchange means responds thereto by reading the source file logical record only if the source file logical record's page number is within the specified range of page numbers.

58. The data exchange apparatus of claim 57 wherein:
the source file logical record contains at least one line which has a line number;
the operation specification means specifies a range of line numbers; and
the record exchange means responds thereto by reading the line only if the line's line number is within the specified range of line numbers.

59. The data exchange apparatus of claim 36 wherein:
the destination file has a document type wherein the destination file logical record is a page made up of lines;
the operation specification means specifies a maximum number of lines on the page; and
the record exchange means responds thereto by placing the line in the destination file logical record only if the number of lines on the page does not exceed the specified maximum number of lines.

60. In a digital computer system having access to files for storing items of data, the files each having a file type of a set of file types, said file type identifying a format of the items of data sorted therein, a method for exchanging one or more of the items of data between a source file having a first file type and a destination file having a second file type that is different from the first file type, comprising performing the steps of:

providing a specification of a data exchange operation; and for each one of the items of data to be exchanged, performing the steps of reading a source file logical record containing the item of data from the source file in accordance with the specification;

producing a generic form from the logical record in accordance with the specification, the generic form representing the item of data as an arrangement of codes representing displayable characters, said arrangement being non-specific to any of the file types;

using the generic form to produce a destination file logical record in which the item of data has a format consistent with a file type of the destination file in accordance with the specification; and writing the destination file logical record to the destination file in accordance with the specification.

61. The method of claim 60 wherein:

the step of providing a specification of the data exchange operation is performed interactively.

62. The method of claim 61 wherein:

the step of interactively providing a specification of the data exchange operation is performed using a display of the generic form.

* * * * *